(12) United States Patent
Terry et al.

(10) Patent No.: US 7,089,088 B2
(45) Date of Patent: Aug. 8, 2006

(54) INTEGRATED HVACR CONTROL AND PROTECTION SYSTEM

(75) Inventors: Robert L. Terry, Tecumseh, MI (US); John A. Pasko, Ypsilanti, MI (US); Arnold G. Wyatt, Jackson, MI (US); Kent B. Herrick, Saline, MI (US); Lee W. Marriott, Ypsilanti, MI (US); Alex Alvey, Ann Arbor, MI (US); Rachel Weingrad, Ann Arbor, MI (US)

(73) Assignee: Tecumseh Products Company, Tecumseh, MI (US)

( * ) Notice: Subject to any disclaimer, the term of this patent is extended or adjusted under 35 U.S.C. 154(b) by 5 days.

(21) Appl. No.: 10/763,990

(22) Filed: Jan. 23, 2004
(Under 37 CFR 1.47)

(65) Prior Publication Data
US 2005/0240312 A1 Oct. 27, 2005

Related U.S. Application Data

(60) Provisional application No. 60/442,655, filed on Jan. 24, 2003.

(51) Int. Cl.
*G05D 23/00* (2006.01)
(52) U.S. Cl. .................................... 700/276
(58) Field of Classification Search ......... 700/275–278
See application file for complete search history.

(56) References Cited

U.S. PATENT DOCUMENTS

| 5,209,075 | A |   | 5/1993 | Kim |
|---|---|---|---|---|
| 5,440,895 | A |   | 8/1995 | Bahel et al. .................. 62/223 |
| 5,481,481 | A |   | 1/1996 | Frey et al. ............. 364/551.01 |
| 5,572,438 | A |   | 11/1996 | Ehlers et al. ............... 364/492 |
| 5,596,507 | A |   | 1/1997 | Jones et al. |
| 5,729,474 | A |   | 3/1998 | Hildebrand et al. |
| 5,761,917 | A | * | 6/1998 | Corcoran et al. ............. 62/133 |
| 5,801,940 | A |   | 9/1998 | Russ et al. .................. 364/138 |
| 5,900,822 | A |   | 5/1999 | Sand et al. |
| 5,950,709 | A |   | 9/1999 | Krueger et al. |
| 6,082,122 | A |   | 7/2000 | Madenokouji et al. ......... 62/77 |
| 6,145,328 | A |   | 11/2000 | Choi ........................... 62/127 |
| 6,222,448 | B1 |   | 4/2001 | Beck et al. .................. 340/506 |
| 6,330,806 | B1 |   | 12/2001 | Beaverson et al. ........... 62/201 |

(Continued)

FOREIGN PATENT DOCUMENTS

EP 0 620 407 A2 4/1994

(Continued)

*Primary Examiner*—Maria N. Von Buhr
(74) *Attorney, Agent, or Firm*—Baker & Daniels

(57) ABSTRACT

An integrated HVACR control and protection system includes a modular and reprogrammable design providing a plurality of possible combinations of power detection, voltage detection, run current detection, transient current detection, temperature detection, universal thermostat interface, peripheral or remote control, and local display and control. The control and protection system is capable of evaluating the relationship between real power used by an HVACR system compressor and other system operating parameters to detect problems early in the failure cycle, i.e., before a failure has progressed to requiring a system shutdown or causing damage to other components. Additionally, a control system and method provide sensorless detection of various HVACR system faults, such as, for example, loss of refrigerant or a refrigerant flow restriction, that impact the relationship between real power and current, voltage, temperature, or other operating parameters. Peripheral or remote control includes wired or wireless system monitoring and parameter programming using a personal digital assistant (PDA), for example utilizing IR communication between the PDA and the control and protection system.

22 Claims, 26 Drawing Sheets

U.S. PATENT DOCUMENTS

| | | |
|---|---|---|
| 6,347,528 B1 * | 2/2002 | Iritani et al. ............... 62/324.6 |
| 6,385,510 B1 | 5/2002 | Hoog et al. |
| 6,501,629 B1 | 12/2002 | Marriott |
| 6,509,654 B1 | 1/2003 | Ciliox et al. ................. 307/11 |
| 6,693,535 B1 * | 2/2004 | Van Bosch et al. ...... 340/539.1 |
| 6,739,145 B1 * | 5/2004 | Bhatnagar .................... 62/127 |
| 2001/0039190 A1 * | 11/2001 | Bhatnagar .................. 455/450 |
| 2002/0059803 A1 | 5/2002 | Jayanth ....................... 62/127 |
| 2002/0106945 A1 | 8/2002 | Wyatt et al. ................ 439/894 |
| 2002/0189267 A1 | 12/2002 | Singh et al. |
| 2003/0098784 A1 * | 5/2003 | Van Bosch et al. ...... 340/425.5 |
| 2005/0043059 A1 * | 2/2005 | Petite et al. ................ 455/557 |

FOREIGN PATENT DOCUMENTS

| | | |
|---|---|---|
| EP | 0 748 991 A2 | 12/1996 |
| EP | 1 152 308 A2 | 11/2001 |
| GB | 2 287 783 | 9/1995 |
| JP | 10336902 | 12/1998 |
| JP | 2001324200 | 11/2001 |
| JP | 2002039649 | 2/2002 |
| WO | WO 02/08674 A1 | 1/2002 |
| WO | WO 02/075227 A1 | 9/2002 |

* cited by examiner

PTAC SYSTEM BLOCK DIAGRAM

REFRIGERATOR SYSTEM BLOCK DIAGRAM

DISPLAY CASE SYSTEM BLOCK DIAGRAM

DISPLAY AND CONTROL PANEL

| SET POINT FORM | ☒ |
|---|---|
| HIGH VOLTAGE TRIP/VAC | 280 |
| LOW VOLTAGE TRIP/VAC | 280 |
| MAX STABLIZATION/AMPS | 9 |
| MAX STABLIZED/AMPS | 9 |
| MAX START/AMPS | 30 |
| MAX RUN/WATTS | 1500 |
| MIN RUN WATTS | 290 |
| MAX START TIME/SEC | 2 |
| STABLIZATION TIME/MIN | 16 |
| TRIP TIME/ 1-255 SEC | 15 |
| DEAD BAND/1-10 DEG F | 5 |
| FAULT STATUS | 0 |
| STARTUP DELAY/1-255 SEC | 10 |
| PROGRAM SET POINTS | READ UNIT SET POINTS |

172

| SET POINT FORM | ☒ |
|---|---|
| AC LINE VOLTAGE/VAC | - |
| AC RUN CURRENT/AMPS | - |
| APPARENT POWER/WATTS | - |
| REAL POWER/WATTS | - |
| READ TEMPERATURE/F | - |
| SET TEMPERATURE | - |
| SYS STATUS | - |
| REFRESH SENSOR READINGS | |

FIG. 17B

| READ SYSTEM SENSOR | ☒ |
|---|---|
| COMPRESSOR CURRENT | - |
| SET TEMPERATURE | - |
| ROOM TEMPERATURE | - |
| AUX TEMPERATURE | - |
| SELECTED MODE | - |
| SYS STATUS | - |
| REFRESH SENSOR READINGS | |

| SET POINT FORM | ☒ |
|---|---|
| POWERUP DELAY 1-255/SEC | 10 |
| MAX. START TIME/SEC | 2 |
| MAXIMUM RUN AMPS | 5.0 |
| TRIP TIME 0-255/SEC | 10 |
| DEADBAND 0-10 DEG/F | 2 |
| POWERUP TEMPERATURE | 70 |
| POWERUP MODE 0-4 | 0 |
| PROGRAM SET POINTS | READ UNIT SET POINTS |

| DISPLAY CASE SETP... | ☒ |
|---|---|

| MEAT SP. | 39 | DIFF. | 9 |
| MIN. | 32 | MAX. | 50 |

☑ <---MEAT MODE ENABLED — 191

| DAIRY SP. | 40 | DIFF. | 9 |
| MIN. | 32 | MAX. | 45 |

☑ <---DAIRY MODE ENABLED — 191

| FROZEN SP. | -1 | DIFF. | 10 |
| MIN. | -18 | MAX. | 32 |

☑ <---FROZEN MODE ENABLED — 190

| SPECIAL SP. | 10 | DIFF. | 6 |
| MIN. | -20 | MAX. | 40 |

☑ <---SPECIAL MODE ENABLED — 191

| POWERUP DELAY TIME | 10 |
| COMPRESSOR TRIP TIME | 60 |
| COMPRESSOR START TIME | 1 |
| MAXIMUM RUN CURRENT | 9 |
| POWER UP MODE | 0 |
| DEFROST INTERVALS | 20 |
| DEFROST DURATION | 30 |
| TERMINATION TEMP | 40 |

☑ <---FAN CYCLES WITH COMPRESSOR — 191
☑ <---TIMED & TEMP DEFROST — 191

| PROGRAM SET POINTS | READ SYS SET POINTS |

INTEGRATED HVACR CONTROL AND PROTECTION SYSTEM

CROSS REFERENCE TO RELATED APPLICATION

This application claims the benefit under Title 35, U.S.C. § 119(e) of U.S. Provisional Patent Application Ser. No. 60/442,655, entitled INTEGRATED HVAC CONTROL AND PROTECTION SYSTEM, filed on Jan. 24, 2003.

BACKGROUND OF THE INVENTION

1. Field of the Invention

The present invention relates to control, monitoring, and protection devices for environmental conditioning systems including heating, ventilation, air conditioning and refrigeration systems ("HVACR systems").

2. Description of the Related Art

Prior HVACR control devices monitor line voltage, line current, and other parameters such as temperature to determine the state of an HVACR system component, such as a compressor. For example, such a device may monitor line current and in the event excess current is detected, for example from a locked motor rotor, the control device will shut down the system. When the control device detects a fault and shuts down the system, a technician typically must physically inspect components of the HVACR system to determine the cause of the fault.

Generally, each separate control device detects a fault after failure of a system component. For example, a direct short sensed by a motor current monitoring device after motor overheating has caused breakdown of the winding insulation, or no heating or cooling capacity detected by a pressure sensor after refrigerant blockage or loss that reduces efficiency. Detection of such faults often does not occur until additional damage has occurred, requiring system shut down until repairs are complete.

Control devices may include limits relating to system parameters, for example, desired temperature, motor current, and pressure. Control devices, for example a circuit card, are generally located within a housing for the HVACR system; therefore, determining and adjusting limits or other aspects of parameters stored by the control device generally requires cumbersome access.

BRIEF SUMMARY OF THE INVENTION

The present invention provides an integrated HVACR control and protection system including a modular and reprogrammable design providing a plurality of possible combinations of power detection, voltage detection, run current detection, transient current detection, temperature detection, universal thermostat interface, peripheral or remote control, and local display and control. The control and protection system is capable of evaluating the relationship between real power used by an HVACR system compressor and other system operating parameters to detect problems early in the failure cycle, i.e., before a failure has progressed to requiring a system shutdown or causing damage to other components. Additionally, a control system and method provide sensorless detection of various HVACR system faults, for example loss of refrigerant or a refrigerant flow restriction, that impact the relationship between real power and current, voltage, temperature, or other operating parameters. Peripheral or remote control includes wired or wireless system monitoring and parameter programming using a personal digital assistant (PDA), for example utilizing IR communication between the PDA and the control and protection system. For the purpose of this application, "HVACR system" includes any environmental conditioning system having at least one of a heating, ventilation, air conditioning, or refrigeration component.

Prior HVACR devices for controlling an HVACR system and detecting a failure in an HVACR system are generally separate, independent devices which cannot be monitored or controlled by a single user interface. The integrated HVACR control and protection system according to the present invention integrates into a single unit both control and failure detection functions, as well as system protection and diagnostic monitoring. Additionally, the control and protection system according to the present invention is modular in design and reprogrammable, therefore, providing a system which is easily configured or reconfigured for a specific HVACR application. The control and protection system includes a power supply, a microcontroller having software, and an HVACR components switching circuit. The HVACR system also includes a selected combination of modular subsystems, which include: a real power sensor circuit, a transient current sensor circuit, an average current sensor circuit, a root mean square (RMS) run current sensor circuit, an RMS voltage sensor circuit, a universal thermostat interface, a temperature sensor interface, a local user display and control interface, and a peripheral or remote control interface. Advantageously, only those subsystems required for an application need to be included, thereby providing a cost-effective solution customized for a particular customer or application.

For example, for a refrigeration system, the control and protection system may be configured to provide basic control and monitoring, as well as transient current detection to protect the hermetically sealed compressor of the refrigeration system from having terminal venting failure as disclosed in U.S. patent application Ser. No. 10/014,692, to Wyatt and Alvey, which is hereby incorporated by reference. The selected modular subsystems for control and protection of a refrigeration system may, for example, include a temperature sensor interface, a local user display and control interface, and a transient current detection circuit.

The control and protection system may also evaluate the relationship between the real power being consumed by the HVACR system and other parameters such as voltage, current, and temperature, to detect system problems earlier in the failure cycle, thereby protecting the HVACR system from failures that are damaging to components or require the system to be shut down. This feature of the invention also provides diagnostic monitoring that may use preset limits or trend data to detect changes in performance and parameters that are indicative of an impending hard failure. By providing such monitoring and protection before a hard failure has occurred, maintenance can be performed before equipment damage or loss of use results. For example, U.S. Pat. No. 6,501,629 to Marriott, hereby incorporated by reference, recognizes the relationship of measured power and changes in motor torque or load that are indicative of impending system malfunctions.

By monitoring real power, voltage, current, temperature, or other parameters, the control and protection system may also provide detection of other faults, such as refrigerant pressure loss or refrigerant blockage, without requiring a pressure or flow indicating sensor. For example, loss of refrigerant pressure generally causes no change in voltage and only a minimal change in current that may be difficult to detect. However, real power, that is, voltage ×current ×cos (θ), which accounts for the phase shift between voltage and current, changes more substantially because of the loss of system efficiency. Therefore, by measuring and evaluating the real power, voltage, and current, the control and protection system can diagnosis a malfunction, provide a notification, and, if necessary, protect the HVACR system from damage by shutting the system off or selecting a protective backup mode of operation.

The control and protection system may include a universal thermostat interface for interfacing any off-the-shelf thermostat control with the system. The control and protection system may also include an interface for a local user display and control system or for a peripheral or remote control system, such as a personal digital assistant (PDA) device or a computer system coupled via a network. The user interface, for example an infrared communications interface such as IrDA, is coupled with the microcontroller so that limits may be set and system parameters monitored.

In one form, the present invention provides a control and protection system for an environmental conditioning system, including a first microcontroller; a temperature input coupled to the first microcontroller; at least two sensor circuits coupled to the first microcontroller, the at least two sensor circuits selected from a group consisting of: a power sensor circuit, a voltage sensor circuit, a current sensor circuit, and a terminal pin venting sensor circuit; a user control coupled to the first microcontroller; and a plurality of switching devices driven by the first microcontroller and adapted to control components of the environmental conditioning system, the first microcontroller driving the plurality of switching devices in response to evaluating signals received from the user control, the temperature input, and the at least two sensor circuits.

In another form, the present invention provides a control and protection system for an environmental conditioning system, including a microcontroller; a plurality of modules selected from a group consisting of: a power sensor circuit, a voltage sensor circuit, a current sensor circuit, and a terminal pin venting sensor circuit, wherein the plurality of modules are coupled to the microcontroller and any one of the plurality of modules may be individually excluded from the control and protection system without affecting the functionality of the remaining ones of the plurality of modules; a temperature input coupled to the microcontroller; a user control coupled to the microcontroller; and a plurality of switching devices driven by the microcontroller and adapted to control components of the environmental conditioning system in response to the microcontroller evaluating signals received from the user control, the temperature input, and the plurality of modules.

In yet another form, the present invention provides a control and protection system for an environmental conditioning system, including a local control having a first microcontroller; a temperature input coupled to the first microcontroller; an electrical sensing circuit mounted on the local controller and coupled to the first microcontroller; a remote control having a second microcontroller; a user control mounted on the remote control and coupled to the second microcontroller; a communications interface coupling the first microcontroller and the second microcontroller; and a plurality of switching devices mounted on the local control and driven by the first microcontroller and adapted to control components of the environmental conditioning system, the first microcontroller driving the plurality of switching devices in response to evaluating signals received from the user control, the temperature input, and the sensor circuit.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 17B is a plan view of a display for monitoring software used on a peripheral device interfaced with the integrated HVACR control and protection system of FIG. 1;

FIG. 21A is a plan view of a display for monitoring software used on a peripheral device interfaced with the PTAC control and protection system of FIG. 2;

FIG. 21B is a plan view of a display for programming software used on a peripheral device interfaced with the PTAC control and protection system of FIG. 2;

FIG. 23B is a plan view of a display for programming software used on a peripheral device interfaced with the display case control and protection system of FIG. 4.

Corresponding reference characters indicate corresponding parts throughout the several views. The exemplary embodiment of the invention illustrated herein is not to be construed as limiting the scope of the invention in any manner.

DETAILED DESCRIPTION

The present invention provides an integrated control and protection system for an HVACR system. The control and protection system ("control system") includes a modular and reprogrammable design providing a plurality of possible combinations of power detection, voltage detection, run current detection, very high transient current detection, temperature detection, universal thermostat interface, peripheral or remote control, and local display and control. The control system is capable of evaluating the relationship between real power used by an HVACR system compressor and other system operating parameters to detect problems early in the failure cycle, i.e., before a failure has progressed to requiring a system shutdown or causing damage to other components. Additionally, a control system and method provide sensorless detection of various HVACR system faults, for example loss of refrigerant or a refrigerant flow restriction, that impact the relationship between real power and current, voltage, temperature, or other operating parameters. Peripheral or remote control includes wired or wireless system monitoring and parameter programming using a personal digital assistant (PDA), for example utilizing IR communication between the PDA and the control system. For the purpose of this application, an HVACR system includes any environmental conditioning system having at least one of a heating, ventilation, air conditioning, or refrigeration component.

Figure 1:
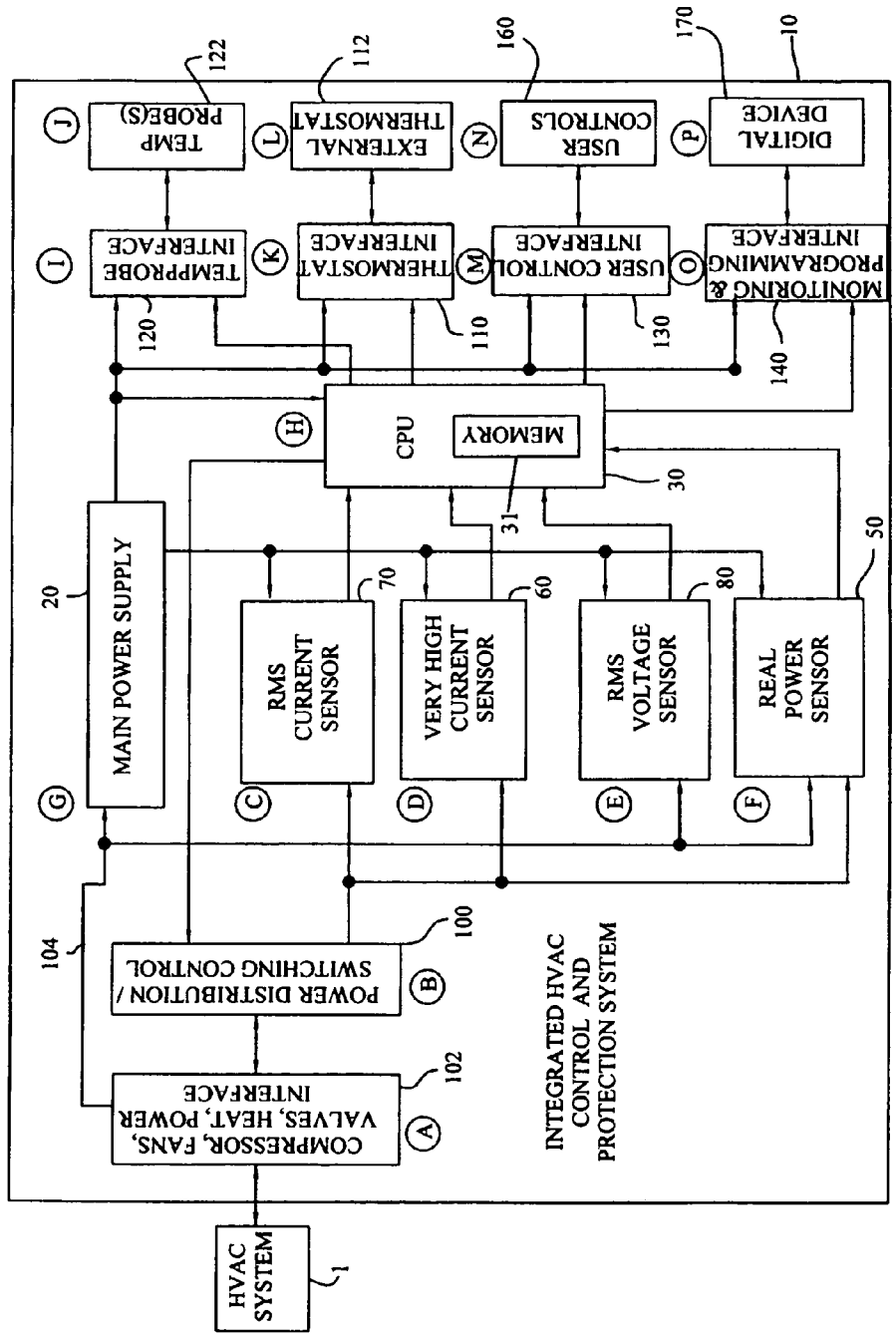
FIG. 1 is a block diagram showing an integrated HVACR control and protection system according to the present invention.

Referring to FIG. 1, a first exemplary embodiment of integrated HVACR control system 10 includes main power supply 20, microcontroller 30, HVACR switching circuit 100, and various other modular subsystems that may be selectively included in control system 10 based on the particular HVACR system 1 application.

The modular subsystems which are to be coupled with microcontroller 30 and which are selectively included in control system 10 generally include electrical sensor circuits and control interfaces. In one exemplary embodiment, electrical sensor circuits include real power sensor circuit 50, transient current sensor circuit 60, RMS run current sensor circuit 70, and RMS voltage sensor circuit 80. Other electrical sensor circuits may include, for example, average current, peak current, temperature, and pressure. Each electrical sensor circuit receives a voltage or current signal associated with HVACR system 1, for example associated with a compressor. Microcontroller 30 receives a conditioned output signal proportional to the measured electrical signal from each electrical sensor circuit.

Modular control interfaces that are selectively included in control system 10 include universal thermostat interface 110, temperature sensor interface 120, user control interface 130, and monitoring and programming interface 140. Temperature sensor interface 120 is coupled with microcontroller 30 and provides a connection for HVACR system 1 temperature sensors, such as ambient temperature, room temperature, evaporator coil temperature, evaporator air temperature, and condenser temperature. Universal thermostat interface 110 is coupled with microcontroller 30 and provides an optical isolator coupled interface for off-the-shelf thermostat control heads 112, such as those providing a mode, heat, fan, and cool signal.

User control interface 130 is coupled with microcontroller 30 and provides an interface for user display and control 160. User display and control 160 enables user monitoring and programming of control system 1 and may include, for example, locally or remotely located display elements and input switches. User control interface 130 may include, for example, display element and switch data lines or a serial peripheral interface (SPI) providing data communication between microcontroller 30 and user display and control 160.

A first monitoring and programming interface 140 may be coupled with microcontroller 30 and provide a data connection for coupling peripheral or remote digital devices 170 such as a PDA or a computer. A second monitoring and programming interface 140 may be coupled with user display and control 160. Interfaces 140 may include, for example, a modem, serial port, SPI, infrared transceiver, wireless transceiver, network interface, Internet gateway, or other data communications device.

Microcontroller 30 monitors parameters received from electrical sensor circuits 50, 60, 70, 80 and from temperature sensor and thermostat interfaces 110 and 120. Microcontroller 30 includes memory 31 for storing operating parameter limits and software for enabling microcontroller 30. Microcontroller 30 may receive new parameter limits for storage in memory 31 through interfaces 130 and 140. Specifically, a user may program parameter limits via user display and control 160 or digital device 170. Additionally, user display and control 160 and digital device 170 may be used to monitor operating parameters, limits, and the status of HVACR system 1. Advantageously, a single digital device 170 may be used to monitor and program a number of control systems 10 which are isolated or are networked via interfaces 140.

Microcontroller 30 is also coupled to HVACR switching circuit 100, which is coupled with HVACR component interface 102. HVACR switching circuit 100 provides relay or other isolated switching for control of HVACR components, such as compressors, heaters, fans, valves, and dampers. Additionally, HVACR component interface 102 provides a voltage supply signal from HVACR system 1. Voltage supply line 104 may power control system 10 and is coupled to RMS voltage sensor circuit 80 for measuring the voltage level supplied to HVACR system 1.

By monitoring HVACR system 1 parameters that are received by microcontroller 30, microcontroller 30 may provide various control and protection functions for HVACR system 1. Specifically, control system 10 may control various components of HVACR system 1 and may provide diagnostic monitoring, failure detection, and system protection by evaluating operating parameters, limits, and trend data to determine if HVACR system 1 is operating properly, is experiencing a change in a performance that requires maintenance and selection of a backup operating mode, or must be shut down to prevent component damage.

Figure 2:
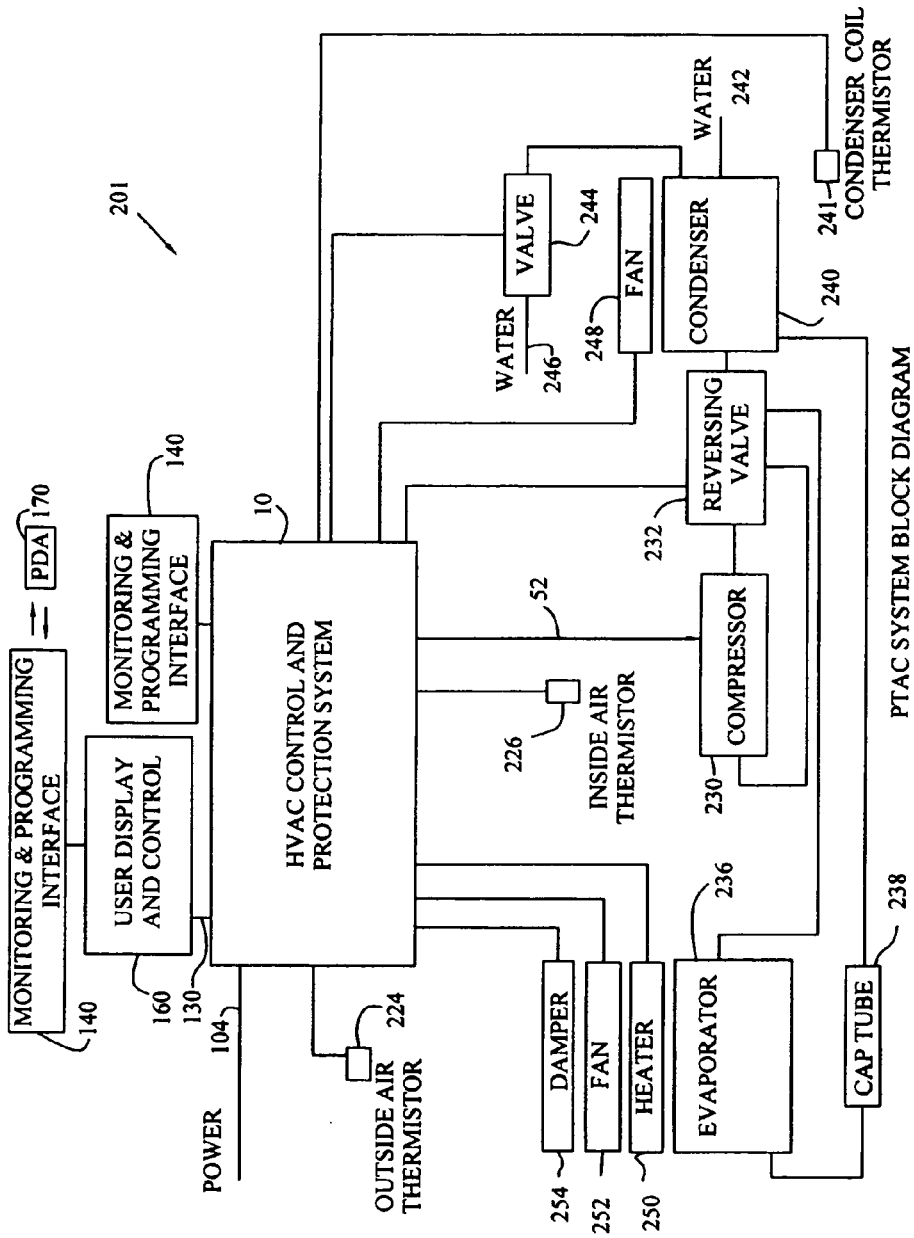
FIG. 2 is a block diagram showing the integrated HVACR control and protection system of FIG. 1 interfaced with a PTAC heating and cooling system.

Referring to FIG. 2, control system 10 is coupled to a first exemplary HVACR system 201, which is representative of a typical PTAC, for example, a through the wall heating and cooling system such as those typically used in hotel rooms. In this first exemplary embodiment, control system 10 may include selected modular subsystems advantageous for control and protection of HVACR system 201. For example, control system 10 may include temperature sensor interface 120 (FIG. 1) for coupling outside air thermistor 224, inside air thermistor 226, and condenser coil thermistor 241 with microcontroller 30 (FIG. 1). In one exemplary embodiment, real power sensor circuit 50 (FIG. 1) receives a voltage supply signal carried by line 104 and a compressor current signal carried by compressor power line 52, in order to monitor real power consumed by compressor 230.

Additionally, control system 10 includes user control interface 130 and user display and control 160 for displaying system status and parameters, for example limits, outside air temperature, inside air temperature, condenser coil temperature, and real power. User display and control 160 may also include switches for selecting operating modes and for adjusting parameter limits, for example preferred inside air temperature and maximum real power.

Figure 20:
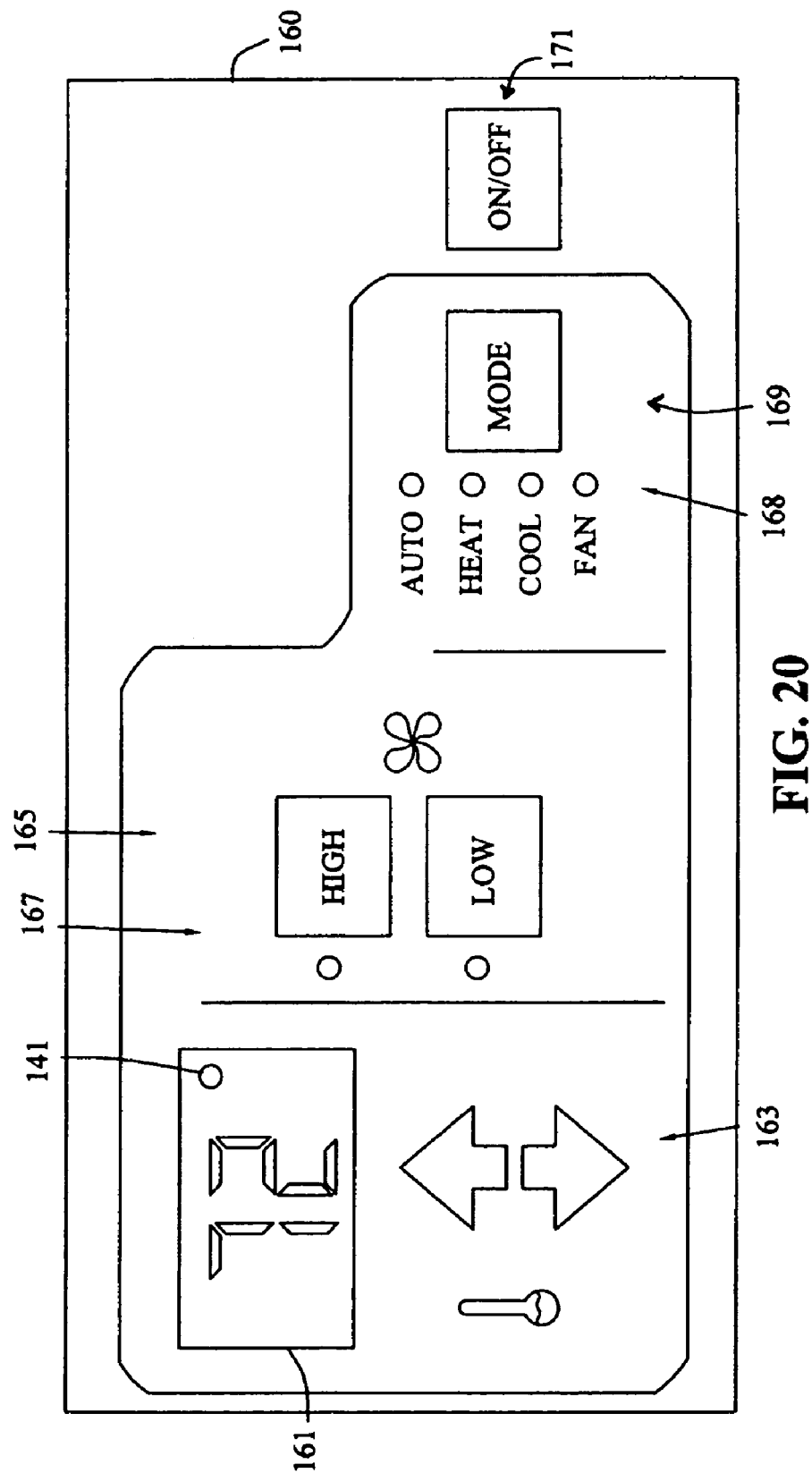
FIG. 20 is a plan view of the user display and control device used with the PTAC control and protection system of FIG. 2.

One exemplary PTAC display and control 160', shown in FIG. 20, includes LCD display 161, temperature adjust switches 163, fan speed switches 165, fan speed indicators 167, mode indicators 168, mode selection switch 169, and power switch 171. Switches of display and control 160 may include back-lighting. Advantageously, display 161 may provide display of adjustment of limits, such as the desired temperature, and monitoring information, such as the room temperature and system fault information, for example error codes associated with typical failure modes.

Additionally, control system 10 may include control interfaces 140 and digital device 170 for providing system monitoring and control via a PDA or a remote device, such as a computer connected via a network connection. For convenient line-of-site access to control interface 140, for example an IrDA interface which is coupled to user display and control 160', infrared transceiver 141 of control interface 140 may be mounted on the face of display and control 160'.

Referring to FIGS. 21A and 21B, exemplary PDA software interfaces for monitoring and programming control system 10 are shown. FIG. 21A shows PDA interface 175 for monitoring parameters and system status, for example, diagnostic and fault information. FIG. 21B shows PDA interface 176 for viewing and editing parameter limits. The display values may be automatically updated on a period basis, or PDA interfaces 175 and 176 provide selection areas 177 for uploading or download parameters.

Microcontroller 30 (FIG. 1) of control system 10 controls HVACR system 201 based on established mode selection, operating parameter limits and the measured parameters. For example, control system 10 may control reversing valve 232, hot water valve 244, and fan 248, or alternatively, heater 250, fan 252, and damper 254 if the inside air temperature is below the desired limit. Similarly, control system 10 may control reversing valve 232, compressor 230, and fans 248 and 252 to provide heating or cooling from the refrigeration cycle of evaporator 236, capillary tube 238, and condenser 240 upon the inside air temperature being above the selected limit.

Control system 10 may also provide component protection of HVACR system 201 by measuring the real power consumed by compressor 230 and correlating the real power with other parameters, such as RMS current to determine if the torque on motor driving compressor 230 is outside of expected operating parameters for HVACR system 201. For example, a refrigerant leak in HVACR system 201 may cause a measurable phase shift between voltage and current, thus causing a measurable change in real power while voltage remains substantially the same and current changes only minimally. Thus, control system 10 may detect an early refrigerant leak without requiring a refrigerant pressure sensor. Additionally, control system 10 may detect an early refrigerant leak and provide system protection to components of HVACR system 201 by notifying maintenance personnel that maintenance is required before a complete loss of refrigerant causes system shutdown and damage to components of HVACR system 201; for example, via control interfaces 140 and digital device 170 or via user control interface 130 and user display and control 160. Similarly, a blockage in capillary tube 238 of HVACR system 201 will also cause a drop in cooling efficiency that may be detected by comparing the change in real power and with minimal change in voltage and current. Another such condition that may be detected to avert later damaging failure, is condenser coil debris buildup causing restricted air flow and loss in efficiency of HVACR system 201.

Other fault detection and system protection features may be also included in control system 10 by programming microcontroller 30 (FIG. 1) with algorithms, data maps, and/or parameter limitations that define normal operating regions for HVACR system 201. The operating regions may thus include not only an evaluation of a single parameter, but evaluation of multiple parameters and trend data to identify, diagnosis, and report operation that is approaching or exceeding the boundaries defined by the normal operating regions. Additionally, microcontroller 30 may provide system protection of HVACR system 201 by shutting down various components or entering a backup "safe" operating mode. Advantageously, by examining multiple parameters, control system 10 may predict impending failures and control HVACR system 201 to avoid damaging or destroying various components that may result from a hard failure of one component which causes debris or over current conditions to damage other components of HVACR system 201.

Control system 10 may also include very high current sensor circuit 60 (FIG. 1) for detecting very high current associated with a locked motor rotor, motor winding arcing, or impending terminal venting failure from excess current. By detecting transient or continuous very high currents and rapidly shutting down compressor 230, rapid overheating or the risk of fire may be avoided. High currents may be, for example 40 to 50 amps during motor start and even higher for a motor winding short, while normal motor operation may only draw 6 to 8 amps.

Additionally, excessive current that may not be detected by a conventional current circuit may cause terminal venting. Terminal venting is a separation of the metallic compressor input terminals from the surrounding insulating material in which the pins are mounted in the terminal supplying power through the hermetic seal to the motor internal to a hermetically sealed compressor. Such a failure to the hermetic seal may result in uncontrolled release of refrigerant gas, and in the case of a hydrocarbon-based refrigerant, a fire risk. Therefore, because such very high over current conditions may rapidly damage components of HVACR system 201, very high current sensor circuit 60 may also provide an interrupt input to microcontroller 30 to rapidly shut down compressor supply power 52 to compressor 230, thereby averting damage that even brief continued operation may cause. Advantageously, the current measurement of very high current sensor circuit 60 may be in terms of RMS current, thus enabling microcontroller 30 to display or transmit the current in the same measurement terms as is typically used by meters used by service technicians.

Control system 10 may also include RMS run sensor circuit 70 (FIG. 1) for detecting the operating current of compressor 230 during normal operation, not during transient startup or shutdown of compressor 230. Various system failures may be detected by monitoring the current, for example, the failure of one of fans 248 and 252 may cause compressor 230 to draw additional current because of the loss of efficiency of HVACR system 201. A failed or damaged compressor motor may also cause an increased current. A loss of refrigerant may be detected by measuring a decrease in compressor current for a given voltage. Thus, by monitoring the current provided to compressor 230 during normal running, microcontroller 30 may detect and report system problems and shut down HVACR system 201 if necessary to avoid damage to system components. Advantageously, because RMS run current sensor circuit 70 is provided separately from very high current sensor 60 and is used for measuring lower current levels, a higher resolution measurement than is used for very high current sensor 60 may be provided to microcontroller 30.

Control system 10 may also include RMS voltage sensor circuit 80 (FIG. 1) for measuring a voltage supply signal carried by line 104, which supplies power to HVACR system 201 and control system 10. Microcontroller 30 may measure RMS voltage to detect problems with voltage supply signal 104 which could damage components of HVACR system 201. For example, to protect the motor (not shown) which drives compressor 230 from being damaged by an incorrect wiring installation that provides the wrong supply voltage for HVACR system 201.

During a power brownout, or when power is reestablished after a blackout, multiple HVACR systems 201 may try to simultaneously run off the same power limited source, causing a voltage sag. Operating at a lower than rated voltage could result in compressor motor damage due to excess currents that may be drawn at a voltage lower than that specified. Microcontroller 30 or digital device 170 may be programmed to stage different HVACR systems 201 at different voltage levels. For example, various units could be programmed to have different voltage limits, such as 105, 100, 95, and 90. Alternatively, in the event the voltage supply signal carried by line 104 falls below a limit, microcontroller 30 may include a preset duty cycle, or respond to a digital device 170 in order to cycle HVACR system 201 sequentially, thereby eliminating or reducing voltage sags.

Figure 3:
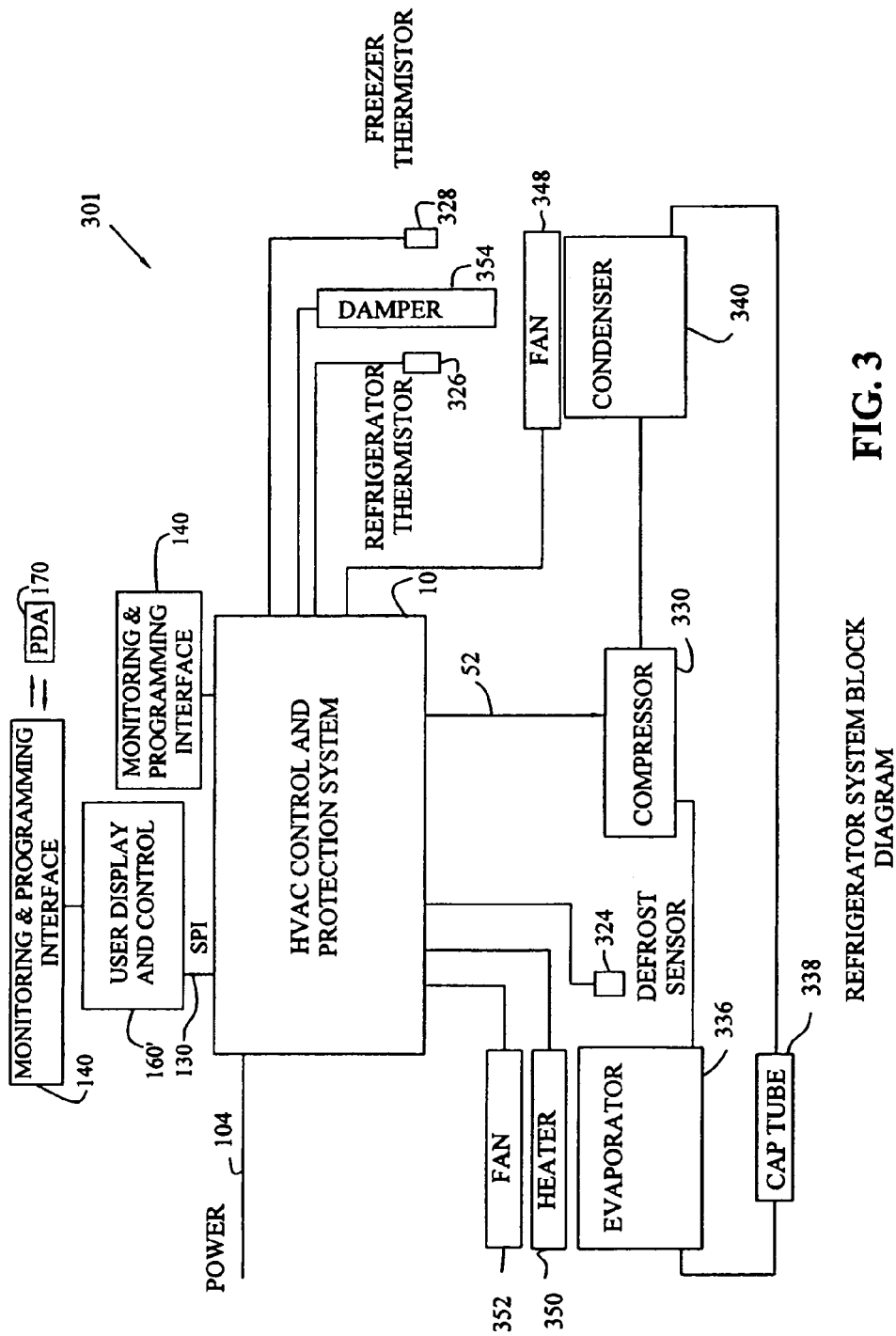
FIG. 3 is a block diagram showing the integrated HVACR control and protection system of FIG. 1 interfaced with a refrigeration system.

Referring to FIG. 3, control system 10 is coupled to second embodiment of HVACR control system 301, which is arranged as a refrigeration system, such as an industrial refrigerator having a refrigerator and a freezer compartment. Similar to the second exemplary embodiment of control system 10, control system 10 also includes microcontroller 30 (FIG. 1) and various selected modular subsystems for controlling and protecting HVACR system 301. For example, control system 10 includes temperature sensor interface 120 (FIG. 1) for interfacing microcontroller 30 with defrost sensor 324, refrigerator thermistor 326, and freezer thermistor 328. Control system 10 also includes user control interface 130 and user display and control 160 and control interfaces 140 and digital device 170 for monitoring and programming HVACR system 301.

Control system 10 may also include one or more electrical sensor circuits 50, 60, 70 and 80 (FIG. 1), for detecting and protecting HVACR system 301 components from fault conditions and failures. Microcontroller 30 may therefore measure various operating parameters, check limits, and diagnose, report and control various aspects of HVACR system 301.

Figure 4:
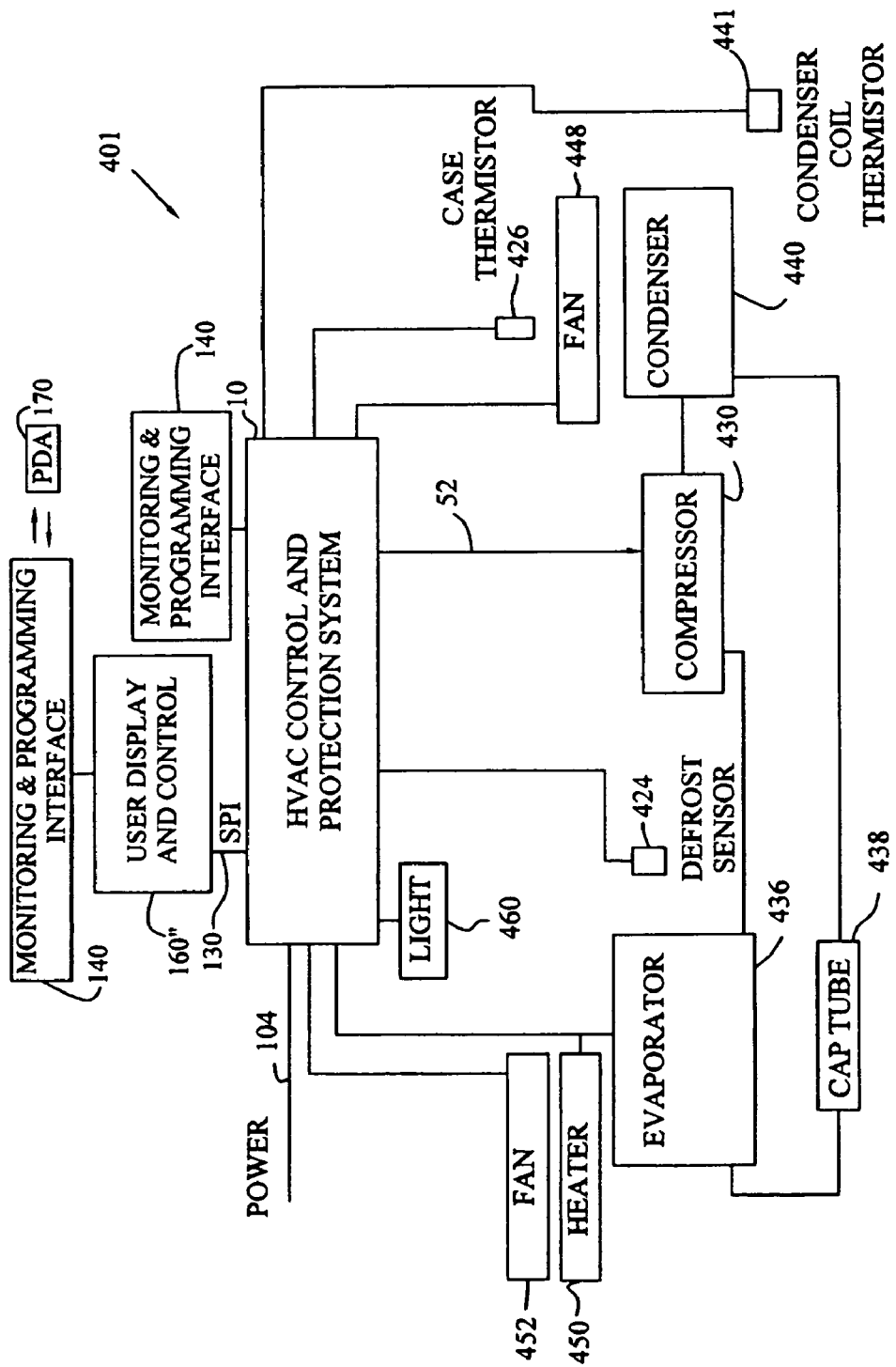
FIG. 4 is a block diagram showing the integrated HVACR control and protection system of FIG. 1 interfaced with a display case refrigeration system.

Referring to FIG. 4, control system 10 is coupled to a third exemplary embodiment of display case system 401 which is configured as a display case refrigerator or freezer system. Similar to the third embodiment of HVACR system 301, HVACR system 401 may be controlled and components of the system protected by control system 410. Additionally, HVACR system 401 may include light 460, which is powered by control system 410 and controlled by microcontroller 30. For example, light 460 may be turned on and off based on certain parameters, such as the time of day. Advantageously, user display and control 160" may be remotely located from control system 10. Specifically, control system 10 may be located inside the display case housing (not shown) and to facilitate access, user display and control 160" may be located on an exterior portion of the display case housing.

Figure 22:
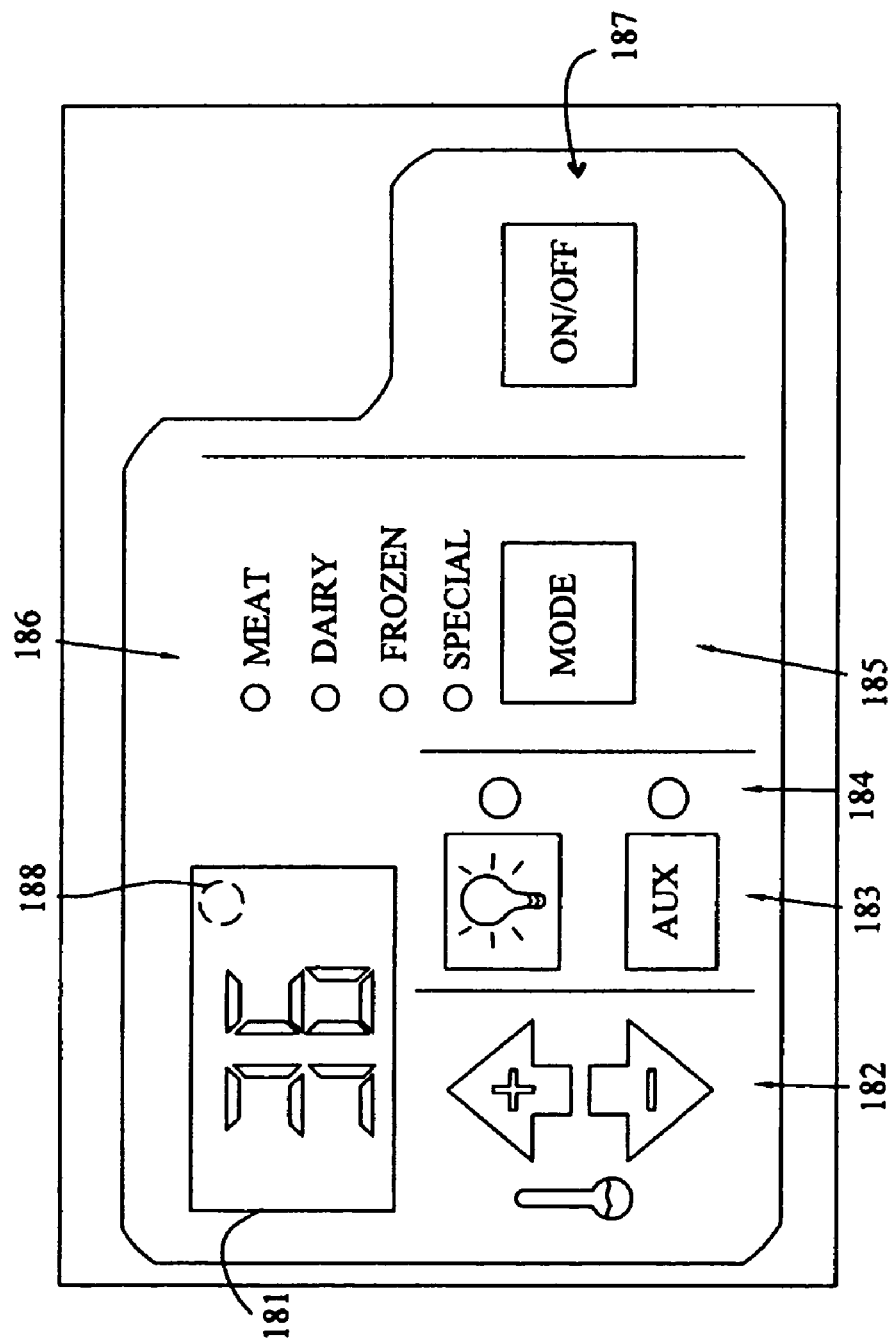
FIG. 22 is a plan view of the user display and control device used with the display case control and protection system of FIG. 4.

One exemplary display case display and control 160", shown in FIG. 22, includes LCD display 181, temperature adjust switches 182, light and auxiliary switches 183, light and auxiliary indicators 184, mode selection switch 185, mode indicators 186, and power switch 187. Switches of display and control 160" may be, for example membrane switches and may include back-lighting. Display 181 may provide display of adjustment of limits, such as the desired temperature, and monitoring information, such as the display case temperature and system fault information, for example error codes associated with typical failure modes.

Additionally, user display and control 160" may include control interface 140 and digital device 170 for providing system monitoring and control via a PDA. For convenient line-of-site access to control interface 140, for example an IrDA interface which is coupled to user display and control 160", infrared transceiver 188 of control interface 140 may be mounted on the face of display and control 160".

Display and control 160" may include a second microcontroller (not shown) for controlling communication with interfaces 130 and 140 and for controlling display 181 and the various switches 182, 185, and 187, and indicators 184 and 186. The second microcontroller also provides communication with microcontroller 30 via user control interface 130, for example a SPI. Advantageously, control system 10 of display case system 401 may be configured to provide system control in the event display and control 160" is not provided or is damaged. Control system 10 may provide an additional interface 140 for monitoring and programming control system 10.

Figure 23A:
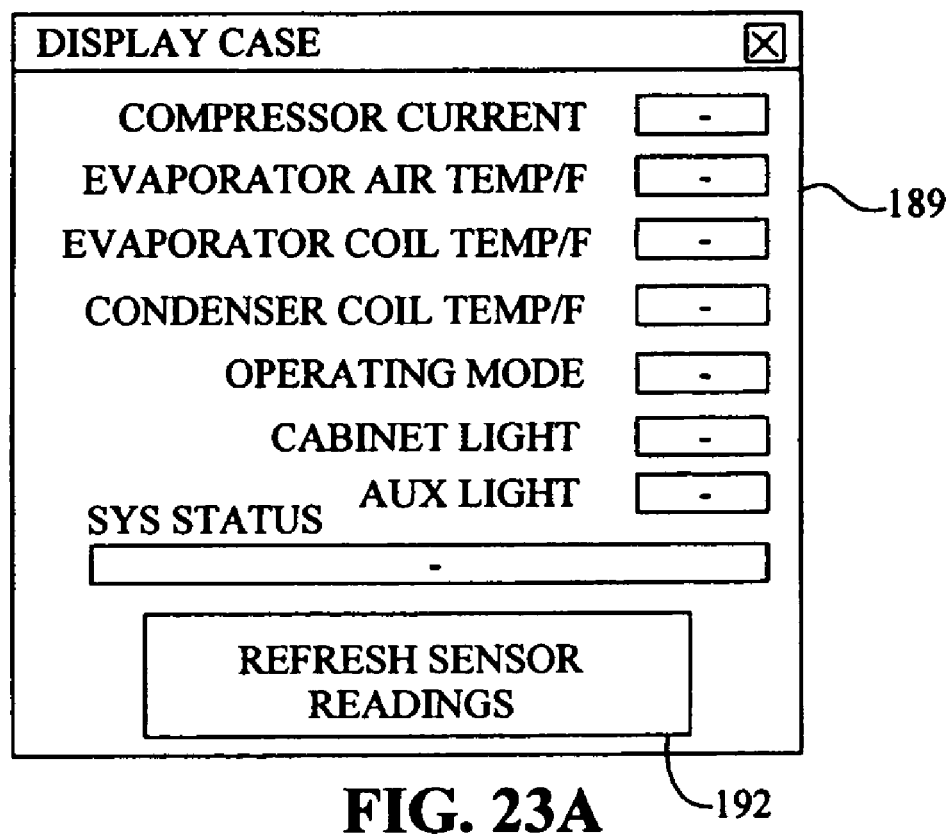
FIG. 23A is a plan view of a display for monitoring software used on a peripheral device interfaced with the display case control and protection system of FIG. 4.

Referring to FIGS. 23A and 23B, exemplary PDA software interfaces for monitoring and programming control system 10 of display case system 401 are shown. FIG. 23A shows PDA interface 189 for monitoring parameters and system status, for example diagnostic and fault information. FIG. 23B shows PDA interface 190 for viewing and editing parameter limits and selecting operating modes 191. The display values may be automatically updated on a period basis, or PDA interfaces 189 and 190 provide selection areas 192 for selecting upload or download parameters.

Figure 5:
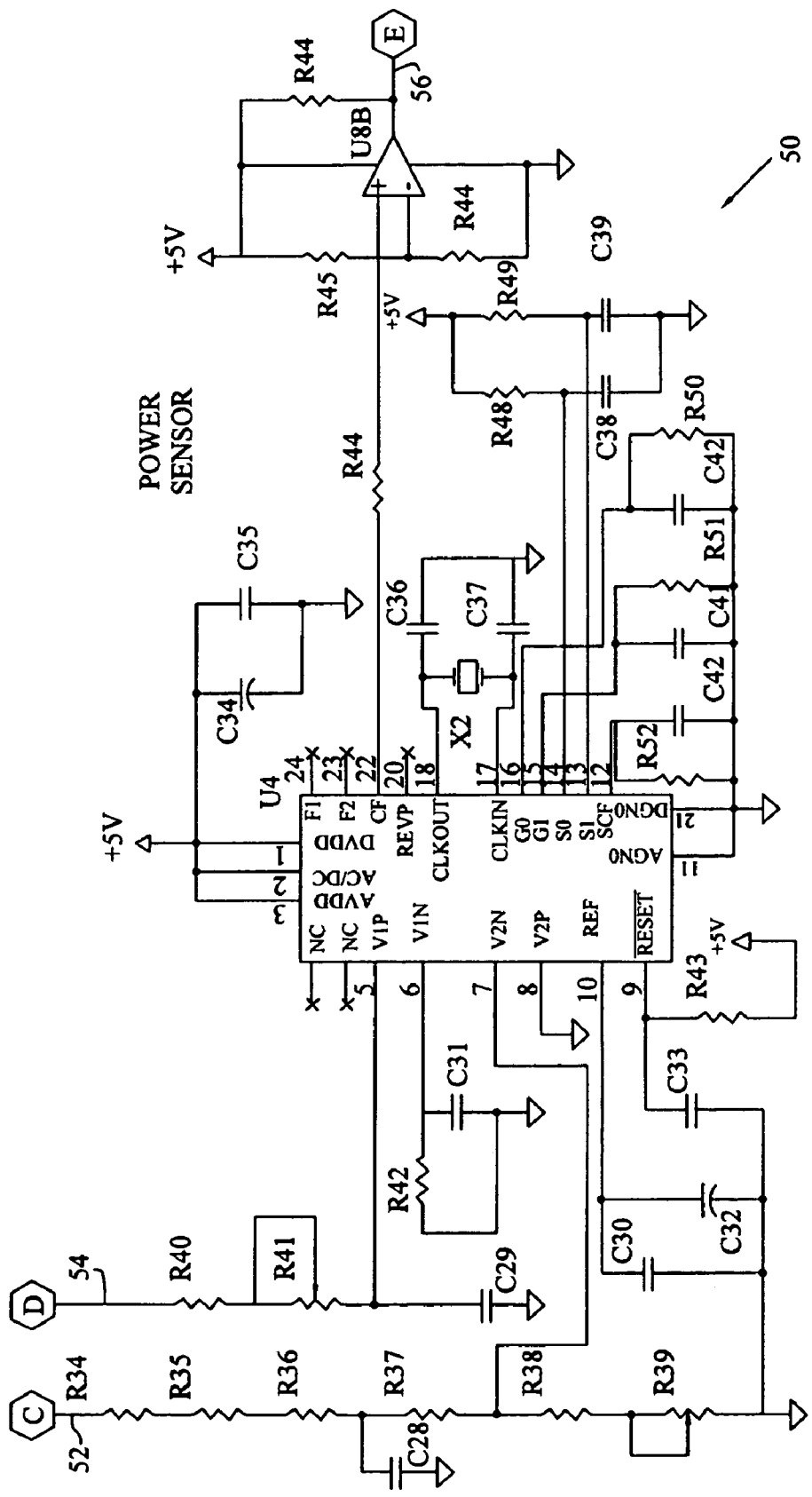
FIG. 5 is a schematic diagram of a portion of the integrated HVACR control and protection system of FIG. 1, including a real power sensor circuit.
Figure 9:
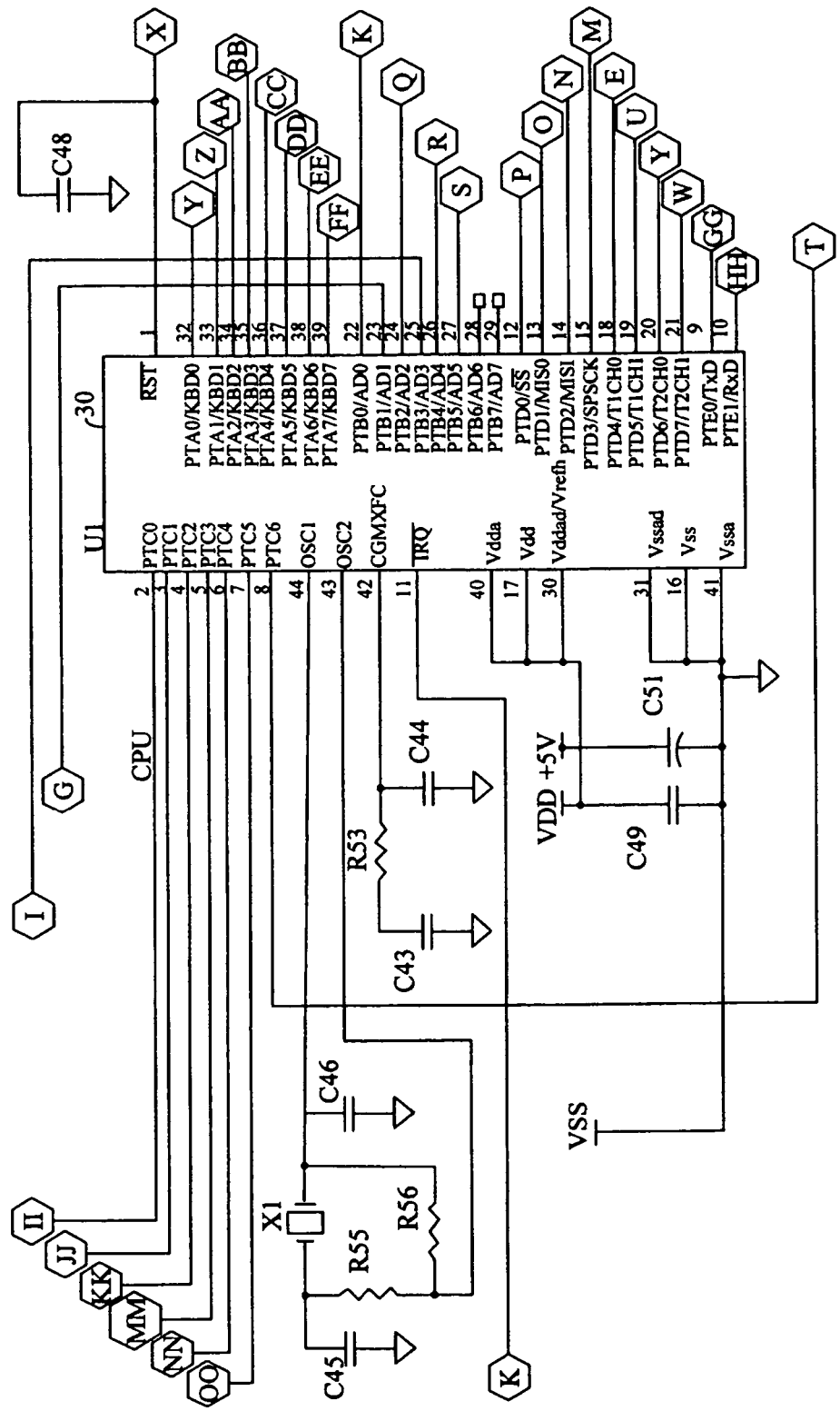
FIG. 9 is a schematic diagram of a portion of the integrated HVACR control and protection system of FIG. 1, including a microcontroller.

Referring to FIG. 5, real power sensor circuit 50 receives a compressor voltage signal carried by line 52 and a compressor current signal carried by line 54 and outputs a real power signal carried by line 56 to pin 18 of microcontroller 30 (FIG. 9). Real power sensor circuit 50 includes power meter integrated circuit (IC) U4, which measures real power based on phase and amplitude of voltage and current, and which may be Part No. AD7755AAN, available from Analog Devices of Norwood, Mass.

Figure 10A:
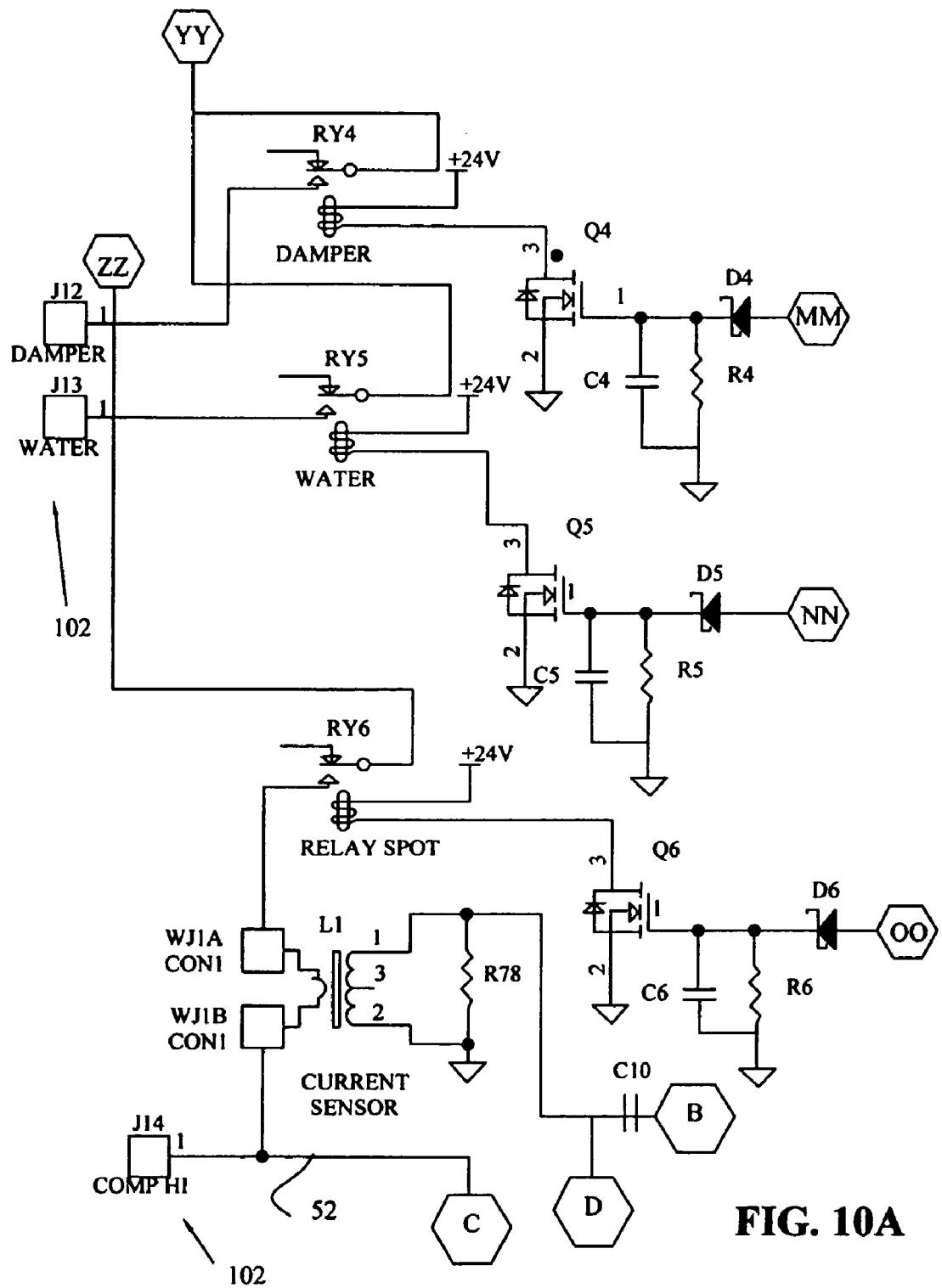
FIGS. 10A and 10B is a schematic diagram of a portion of the integrated HVACR control and protection system of FIG. 1, including an HVACR switching circuit.

Referring briefly to FIGS. 10A, the compressor voltage signal carried by line 52 is provided from HVACR system 1 at connector J14, pin 1. The compressor voltage signal carried by line 52 is additionally supplied to toroidal current sensor L1, which provides compressor current signal carried by line 54 (FIG. 7) and which is proportional to the current supplied to compressor 230 (FIG. 2), 330 (FIG. 3), and 430 (FIG. 4), and is coupled to real power sensor circuit 50.

Referring again to FIG. 5, the compressor voltage signal carried by line 52 is provided through voltage dividing and conditioning network resistors R34, R35, R36, R37, and R38, variable resistor R39, and capacitor C28. The node between resistors R37 and R38 is coupled to input pin 7 of power meter IC U4. Variable resistor R39 may be used to calibrate power meter IC U4 and its associated electrical components. The compressor current signal carried by line 54 is provided to pin 5 of power meter IC U4 by a conditioning and calibration network including resistor R40, variable resistor R41, and capacitor C29.

Power meter IC U4 measures the amplitude and phase relationship of the compressor voltage signal carried by line 52 and the compressor current signal carried by line 54 to output a real power signal at pin 22 of energy meter IC U4. Comparator U8B provides a buffer and transmits a real power signal carried by line 56 to microcontroller 30.

Figure 7:
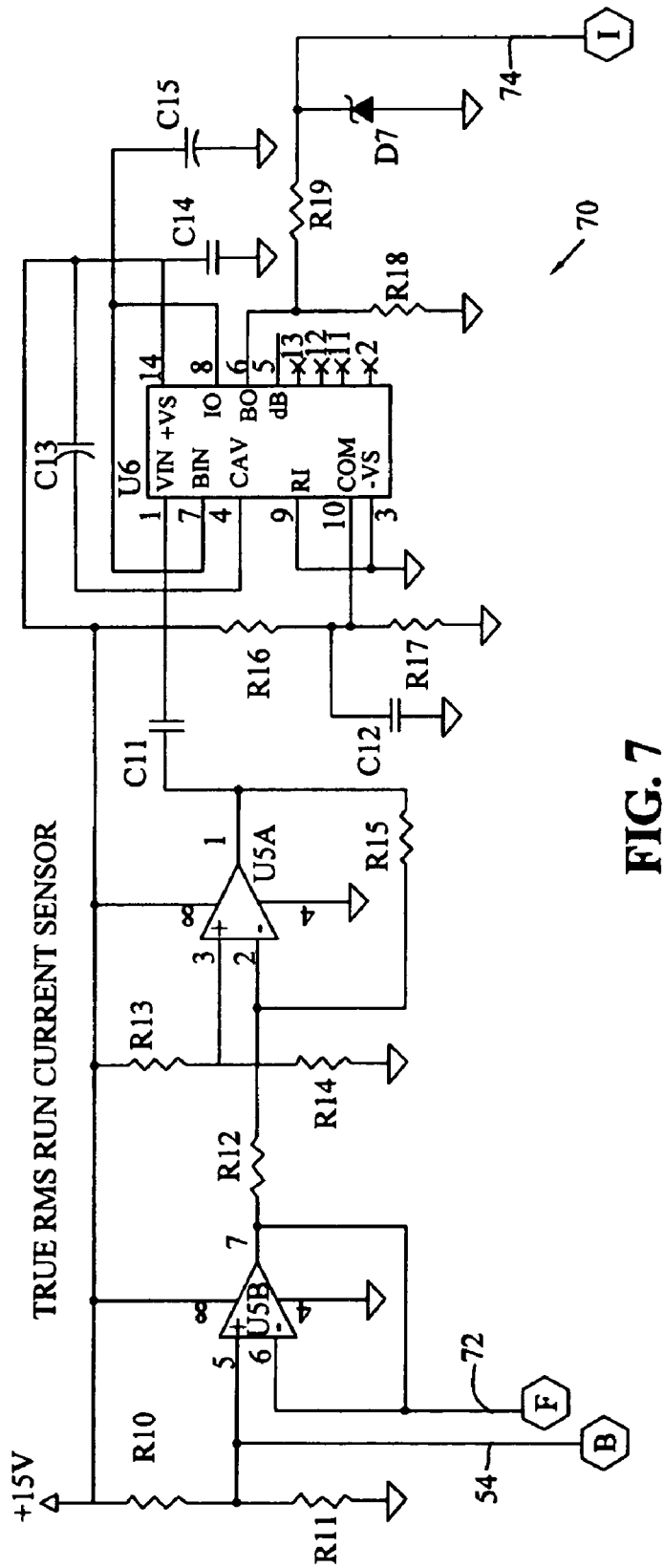
FIG. 7 is a schematic diagram of a portion of the integrated HVACR control and protection system of FIG. 1, including an RMS run current sensor circuit.

Referring to FIG. 7, RMS current sensor circuit 70 receives a compressor current signal carried by line 54 and provides a buffered compressor current signal carried by line 72 to very high current sensor circuit 60, and an RMS current signal carried by line 74 to pin 25 of microcontroller 30 (FIG. 9).

Op amp U5B receives a compressor current signal carried by line 54 and provides the buffered compressor current signal carried by line 72. Op amp U5A amplifies the buffered compressor current signal and provides an amplified output signal to pin 1 of true RMS-to-DC converter U6, which may be Part No. AD536AKQ, available from Analog Devices. A voltage dividing and limiting network, including resistors R18 and R19 and zener diode D7, receives the output signal from pin 6 of converter U6 and provides an RMS current signal carried by line 74 to pin 25 of microcontroller 30.

Figure 6:
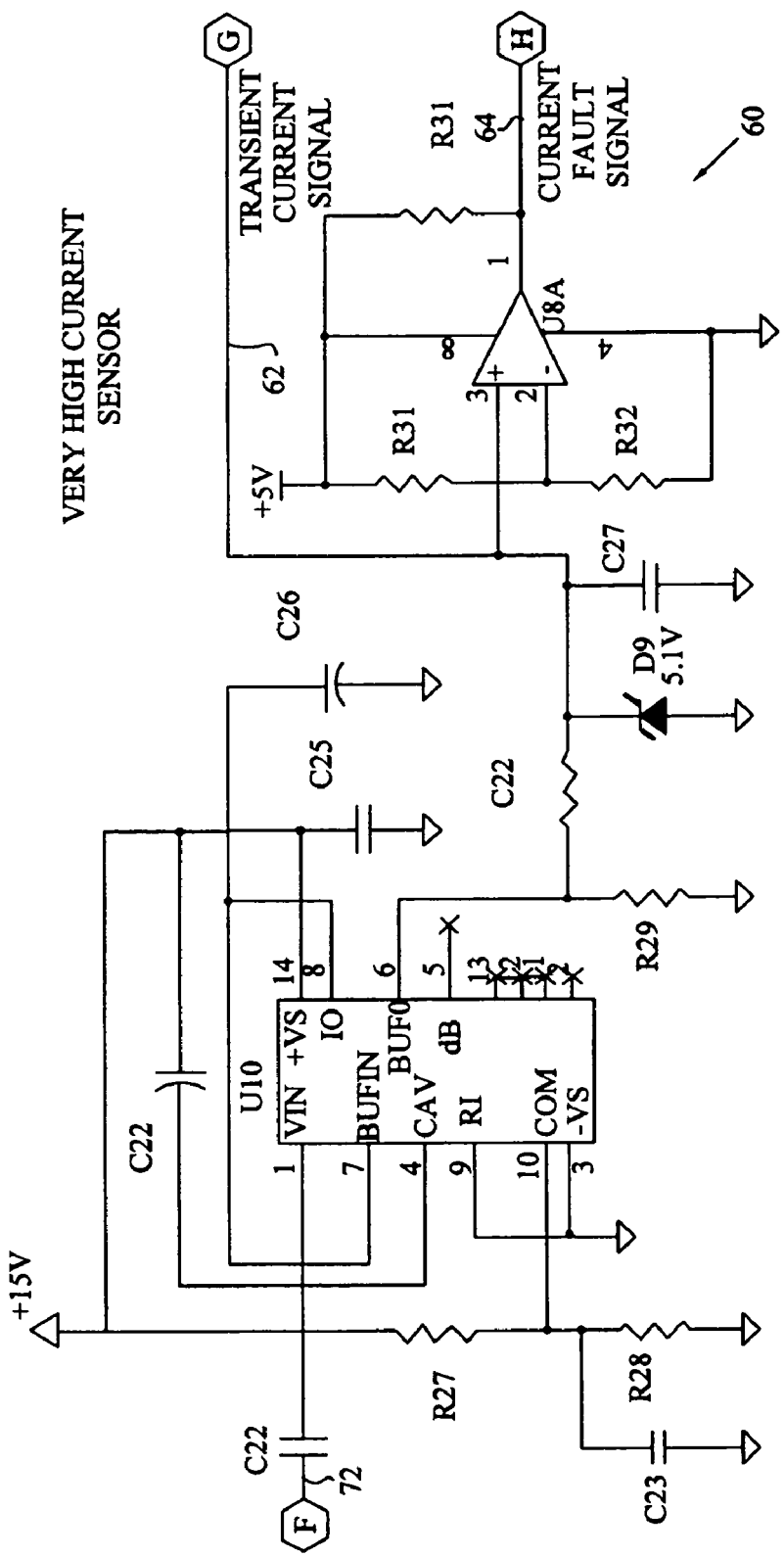
FIG. 6 is a schematic diagram of a portion of the integrated HVACR control and protection system of FIG. 1, including a very high transient current sensor circuit.

Referring to FIG. 6, very high current sensor circuit 60 provides motor starting current protection and terminal pin venting current protection for hermetically sealed compressor 230 (FIG. 2), 330 (FIG. 3), and 430 (FIG. 4). Very high current sensor circuit 60 receives the buffered compressor current signal carried by line 72 from RMS run current sensor circuit 70, and outputs a very high current signal carried by line 62 to pin 23 of microcontroller 30 and a current fault signal carried by line 64 to interrupt pin 11 of microcontroller 30. The buffered compressor current signal carried by line 72 is coupled through capacitor C22 to input pin 1 of true RMS to DC converter U10, for example Part No. AD536AKQ available from Analog Devices.

A voltage and protection network consisting of resistors R29 and R30 and zener diode D9 receives the output from pin 6 of converter U10 and provides the very high current signal carried by line 62 to microcontroller 30 and to comparator U8A. Comparator U8A and related components operates as a switch and produce a current fault signal carried by line 64 for interrupting microcontroller 30, thereby providing a rapid response to a damaging high current condition. For example, upon receiving the current fault signal carried by line 64 to interrupt pin 11, microcontroller 30 will very rapidly disable the compressor of HVACR system 1 by de-energizing relay RY6, shown in FIGS. 10A, which provides compressor power.

Figure 8:
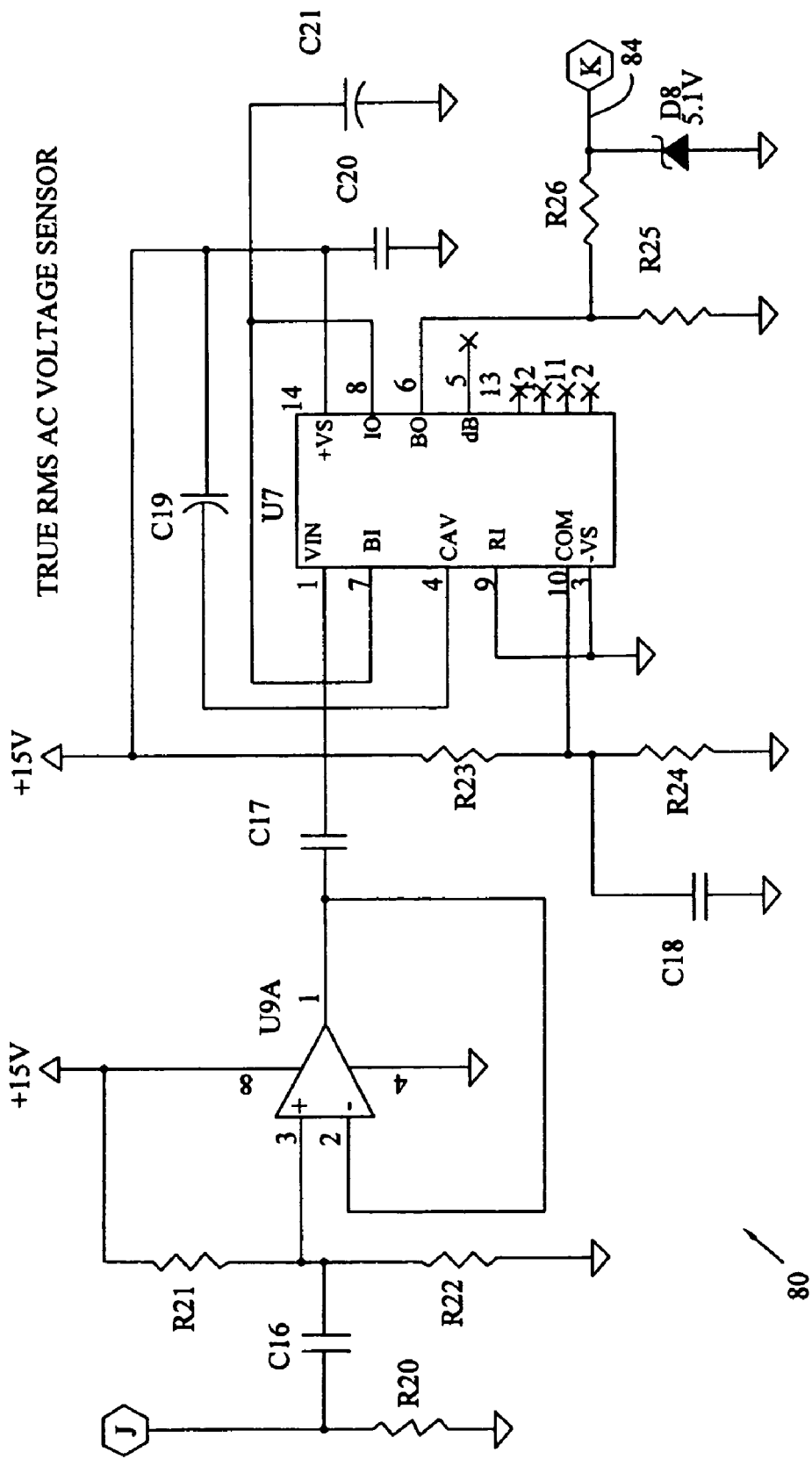
FIG. 8 is a schematic diagram showing a portion of the integrated HVACR control and protection system of FIG. 1, including an RMS voltage sensor circuit.

Referring to FIG. 8, RMS voltage sensor circuit 80 receives a voltage supply input signal carried by line 104 (FIG. 15) and a voltage dividing and conditioning network including resistors R7, R8, R9, R20, and R22 and capacitor C17. Voltage sensor circuit 80 outputs an RMS voltage signal carried by line 84 to pin 25 of microcontroller 30. Comparator U9A and associated components function as a buffer for coupling the voltage supply signal carried by line 104 to input pin 1 of true RMS-to-DC converter U7, such as Part No. AD536AKQ available from Analog Devices. Output pin 6 of converter U7 is coupled to including resistors R25 and R26 and zener diode D8, which provides the RMS voltage signal carried by line 84 to microcontroller 30.

Figure 10B:
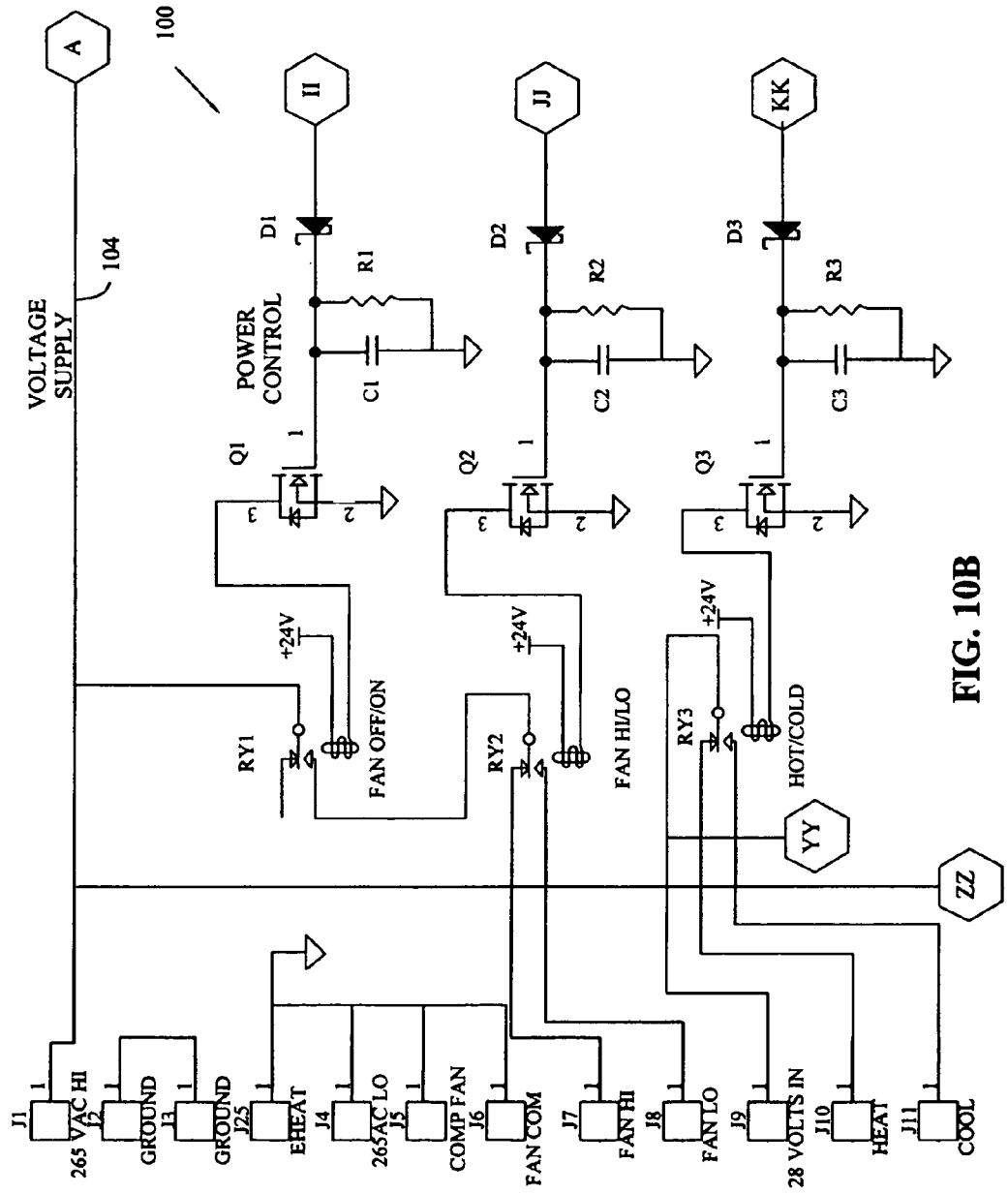

Referring to FIGS. 10A and 10B, HVACR switching circuit 100 provides power distribution, switching, and control for HVACR system 1 at HVACR component interface 102. HVACR switching circuit 100 includes a plurality of switching circuits, each coupled to and controlled by microcontroller 30 and including an FET (Q1–Q5) and associated circuit protection components for driving a relay (RY1–RY5) capable of providing power distribution, switching, and control of HVACR components. Specifically, output pin 2 of microcontroller 30 switches relay RY1 for switching HVACR system 1 fan power on and off. Output pin 3 of microcontroller 30 switches relay RY2 for selection of high or low speed for the fan of HVACR system 1. Output pin 4 of microcontroller 30 switches relay RY3 for selecting the heating or cooling function of HVACR system 1, for example, by activating a reversing valve or other components. Output pin 5 of microcontroller 30 actuates relay RY4 for providing power switching for a damper of HVACR system 1. Output pin 6 of microcontroller 30 actuates relay RY5, providing control power for switching a water valve, such as hot water valve 244, shown in FIG. 2, for HVACR system 201. Output pin 7 of microcontroller 30 actuates relay RY6, for switching voltage supply signal 104 to provide compressor voltage supply signal 52 to the compressor of HVACR system 1.

Alternatively, HVACR switching circuit 100 may include types of switching devices other than relays, for example, optically isolated couplers, and may also switch and control other HVACR system components. HVACR component interface 102 provides connection points for the various signals and power switching provided by HVACR switching circuit 100.

Figure 11:
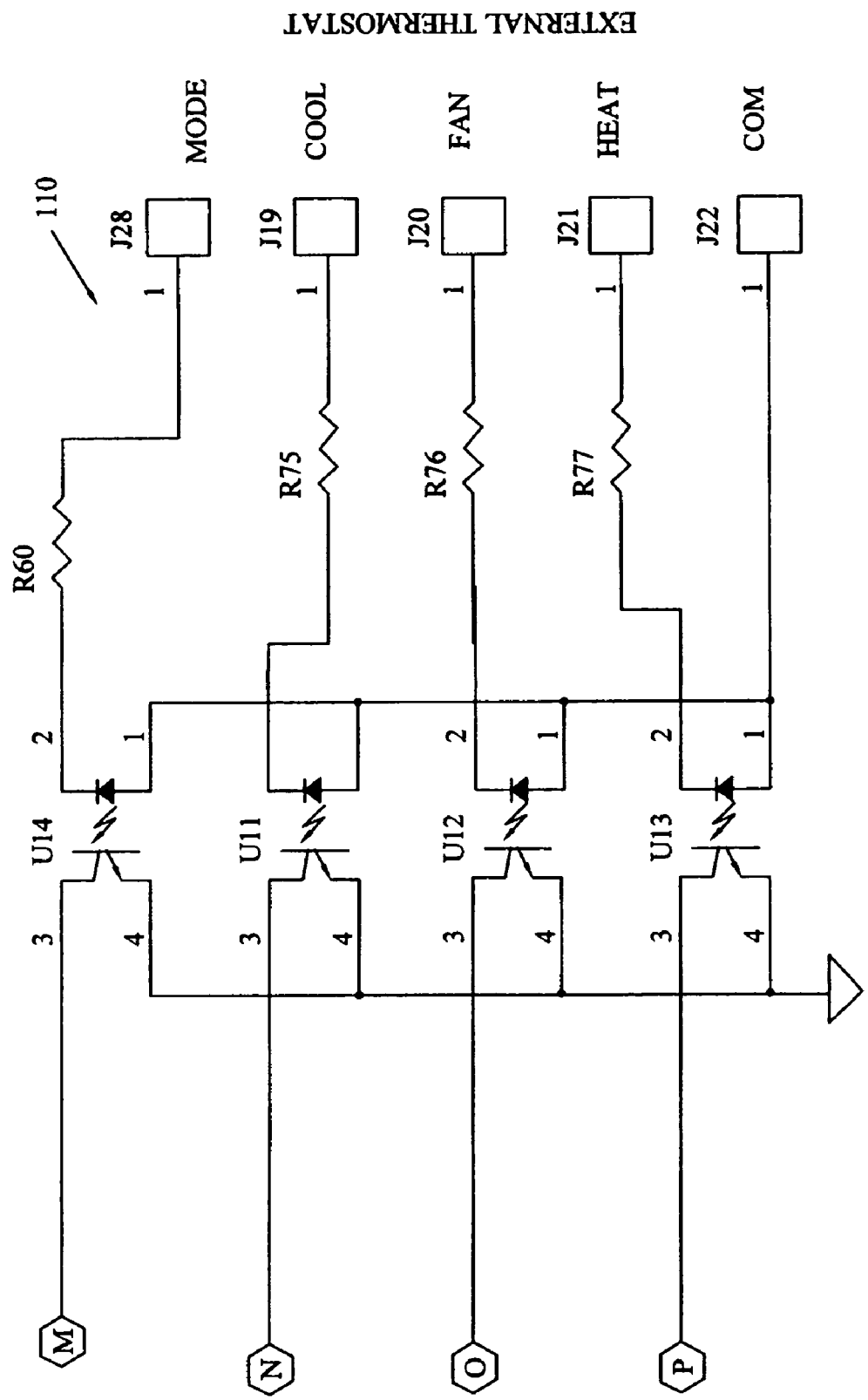
FIG. 11 is a schematic diagram of a portion of the integrated HVACR control and protection system of FIG. 1, including a universal thermostat interface.

Referring to FIG. 11, universal thermostat interface 110 provides coupling of microcontroller 30 with off-the-shelf thermostat control head 112. Thermostat interface 110 provides optically isolated coupling for typical thermostat control signals, including mode, cool, fan, heat, and common. The thermostat input signals drive an LED in the respective optically isolated coupler U11–U14. Optically coupled isolators U11–U14 each include an internal transistor activated by the LED, and, upon activation, provide a low logic signal coupled to input ports of microcontroller 30. Specifically, input pin 15 of microcontroller 30 receives the thermostat mode signal, input pin 14 receives the cool signal, input pin 13 receives the fan signal, and input pin 12 receives the heat signal. Advantageously, thermostat control heads 112 may also be coupled in series in a master slave arrangement.

Figure 12:
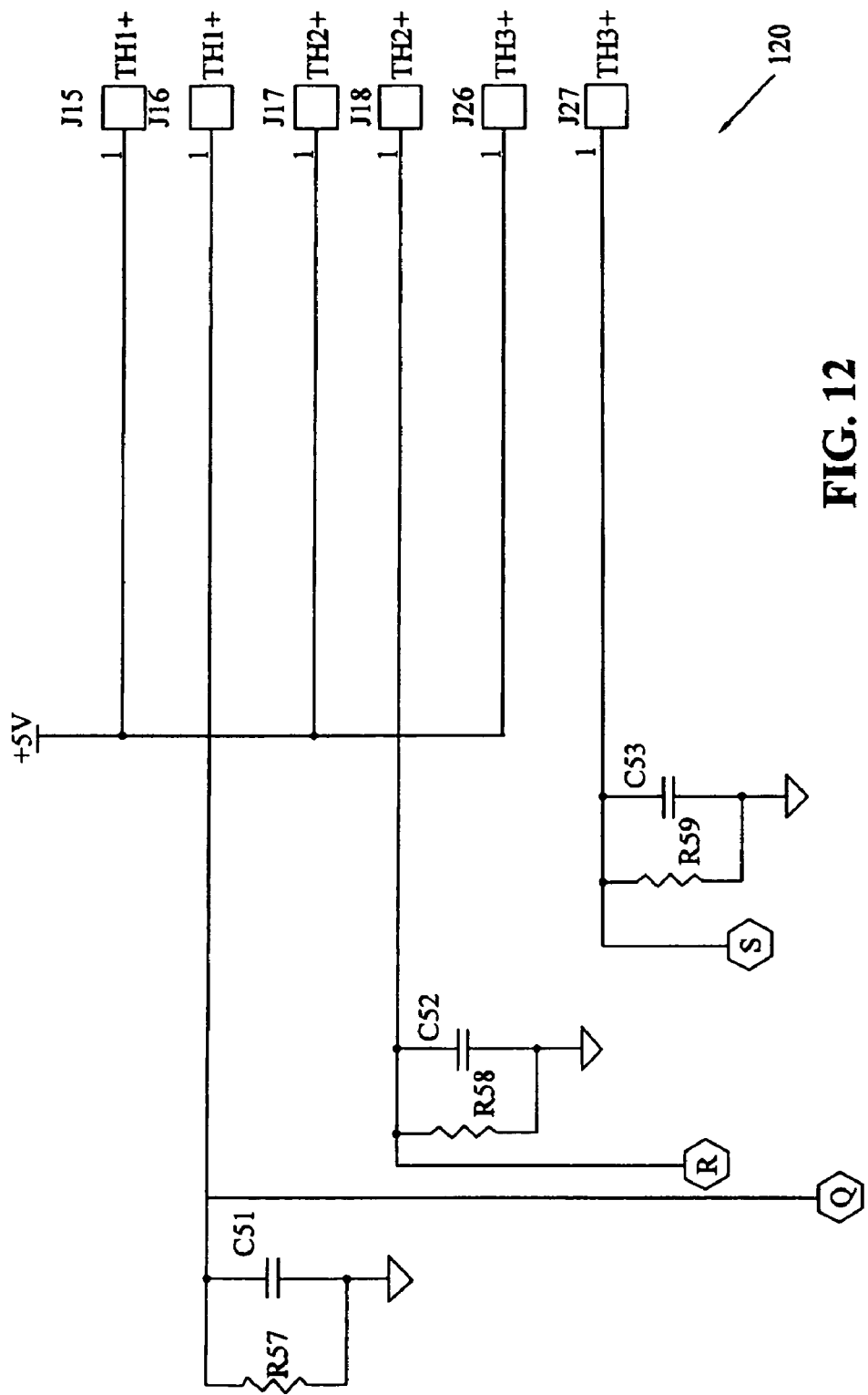
FIG. 12 is a schematic diagram of a portion of the integrated HVACR control and protection system of FIG. 1, including a temperature sensor interface.

Referring to FIG. 12, control system 10 may also include temperature sensor interface 120 for coupling temperature sensors 122 with microcontroller 30. Specifically, a five-volt supply source is provided to power temperature sensors 122, and a plurality of temperature sensor signal input ports J13, J18, and J27 receive temperature sensor input signals which are then conditioned and coupled to analog-to-digital (A/D) converters at pins 24, 26, and 27 of microcontroller 30. Typical temperature sensors 122 may monitor, for example, ambient temperature, room temperature, defrost evaporator coil freeze protection temperature, evaporator air temperature, and condenser temperature. Temperature sensor interface 122 may drive thermistors, RTDs, thermocouples, or similar devices for measuring temperatures associated with control and protection of HVACR system 1. Also, temperature sensors 122 for two rooms or zones may be coupled with temperature sensor interface 120 and averaged by microcontroller 30 for controlling HVACR system 1. Typically, temperature sensors 122 and temperature sensor interface 120 may be utilized in applications not having a thermostat control head 112.

Figure 13:
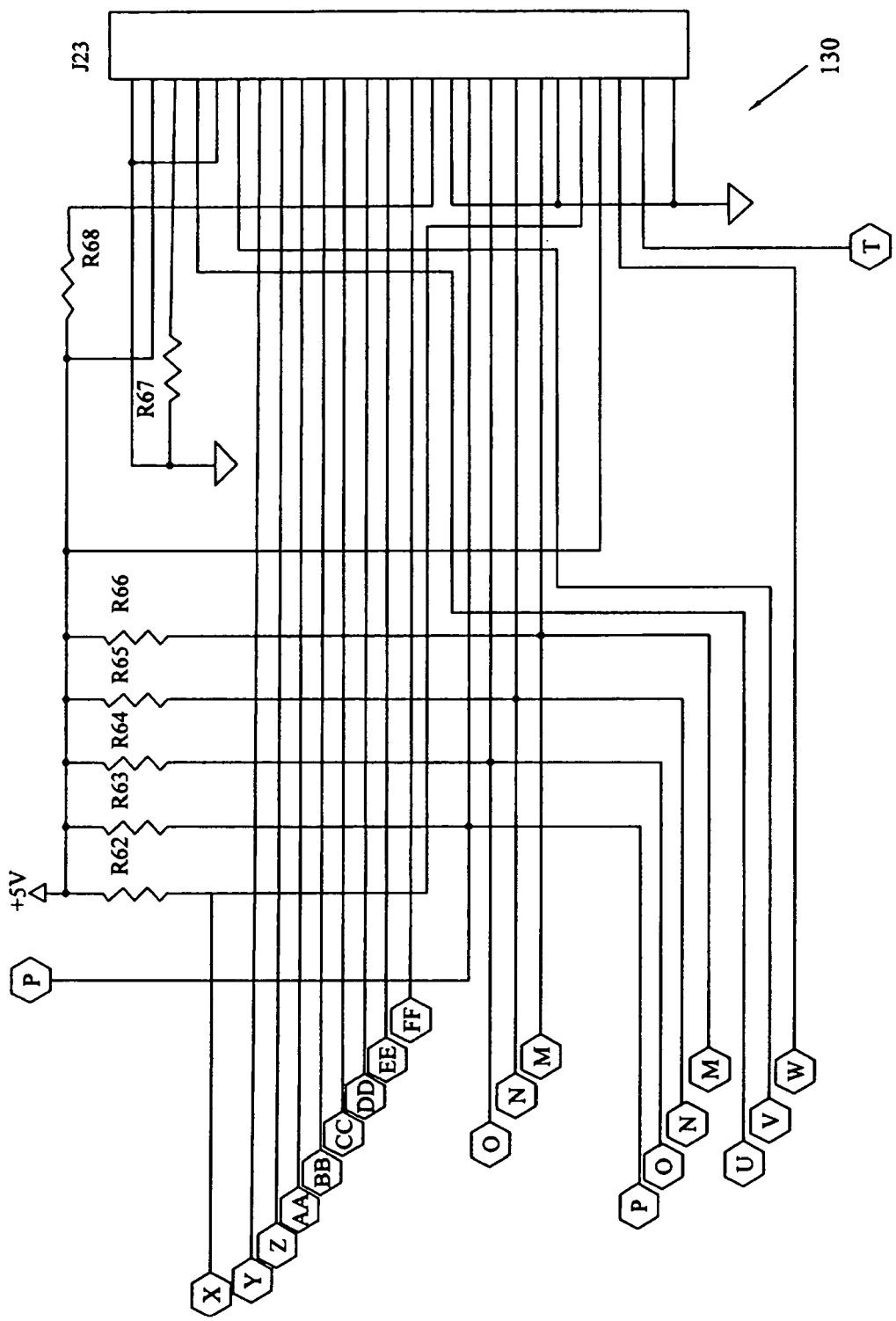
FIG. 13 is a schematic diagram of a portion of the integrated HVACR control and protection system of FIG. 1, including a local user display and control interface.
Figure 16A:
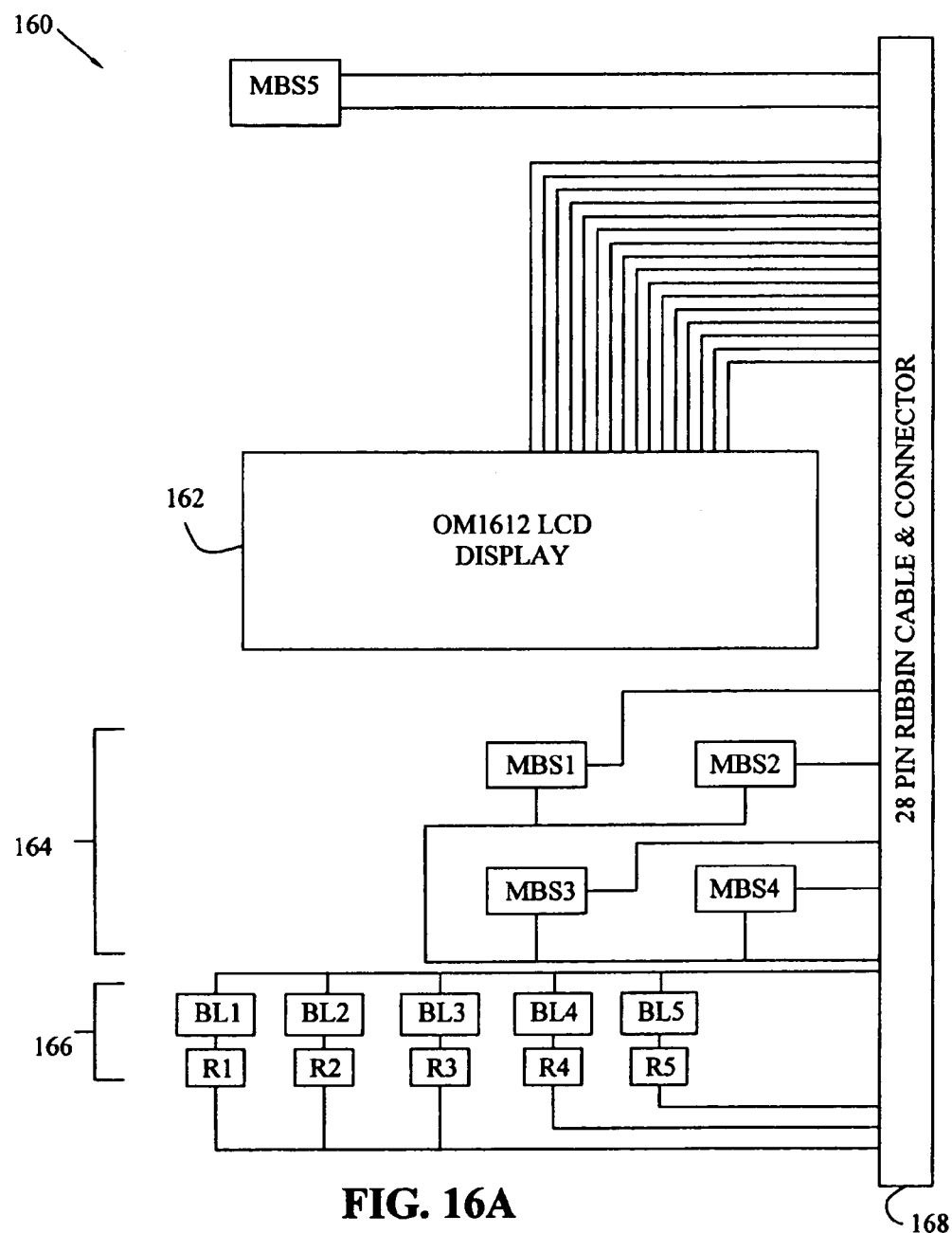
FIG. 16A is a schematic diagram of a portion of the integrated HVACR control and protection system of FIG. 1, including a user display and control device.
Figures 16B, 17A:
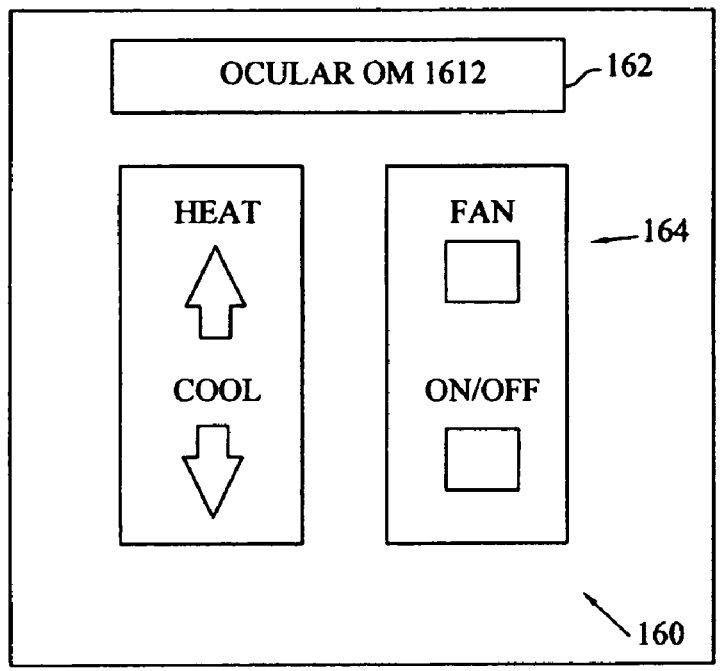
FIG. 16B is a plan view of the user display and control device of FIG. 16A.
FIG. 17A is a plan view of a display for programming software used on a peripheral device interfaced with the integrated HVACR control and protection system of FIG. 1.

Referring to FIG. 13, user control interface 130 provides connector J23 for coupling user display and control 160 to microcontroller 30. For example, as shown in FIGS. 16A and 16B, user display and control 160 provides an LCD display 162 and input control switches 164 for controlling HVACR systems, such as the PTAC configured HVACR system 201 shown in FIG. 2. Switches 164 may include back-lighting 166 and provide typical HVACR control inputs, via switches 164, such as on/off, fan, heat and cool mode select, and temperature increase and decrease. Advantageously, display 162 may provide display of adjustment of limits, such as the desired temperature, and monitoring information, such as the room temperature and system fault information. Table 1 provides an index of user control interface 130 connector J23 pin assignments, descriptions, and corresponding microcontroller 30 port ("uP") connections or other circuit connections.

TABLE 1

| Connector J23 Pin | Assignment | Description | Connection |
| --- | --- | --- | --- |
| 1 | Vss | LCD Gnd | Grounded |
| 2 | Vdd | LCD Supply | +5 Vdc |
| 3 | Vadj | LCD Contrast | Resistors to GND |
| 4 | RS | HI = Data LO = Instruction | uP PTD5 Pin 19 |
| 5 | R/W | HI = Read LO = Write | Grounded |
| 6 | E | Enable Line | uP PTD6 Pin 20 |
| 7 | D0 | LCD Data Line | uP PTA0 Pin 32 |
| 8 | D1 | LCD Data Line | uP PTA1 Pin 33 |
| 9 | D2 | LCD Data Line | uP PTA2 Pin 34 |
| 10 | D3 | LCD Data Line | uP PTA3 Pin 35 |
| 11 | D4 | LCD Data Line | uP PTA4 Pin 36 |
| 12 | D5 | LCD Data Line | uP PTA5 Pin 37 |
| 13 | D6 | LCD Data Line | uP PTA6 Pin 38 |
| 14 | D7 | LCD Data Line | uP PTA7 Pin 39 |
| 15 | LED+ | LCD Back Light Anode | 47 ohm to +5 Vdc |
| 16 | LED− | LCD Back Light Cathode | Grounded |
| 17 | MBS1 | Temp UP | uP PTD0 Pin 12 |
| 18 | MBS2 | Fan HI/LO | uP PTD1 Pin 13 |
| 19 | MBS3 | Temp DWN | uP PTD2 Pin 14 |
| 20 | MBS4 | Mode | uP PTD3 Pin 15 |

TABLE 1-continued

| Connector J23 Pin | Assignment | Description | Connection |
| --- | --- | --- | --- |
| 21 | MBS− | Common | Grounded |
| 22 | MBS5 | Reset Button | To Reset Pin 1 |
| 23 | BL+ | Back Light Anodes | +5 VDC |
| 24 | BL4G | MBS4 Green Backlight | uP PTD7 Pin 21 |
| 25 | BL4R | MBS4 Red Backlight | uP PTC6 Pin 5 |
| 26 | BL123 | Back light for MBS1, 2, 3 | Grounded |

Figure 14:
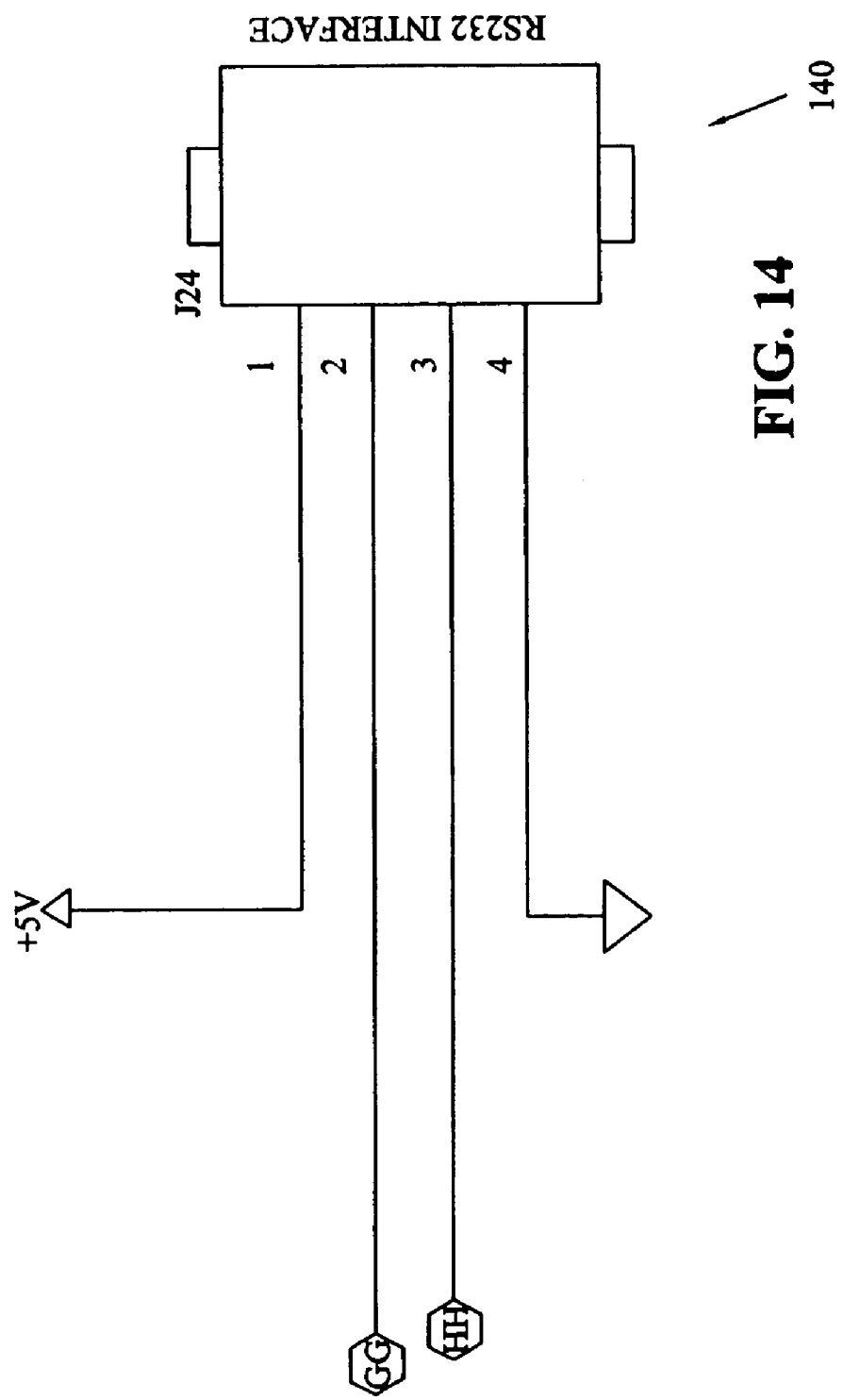
FIG. 14 is a schematic diagram of a portion of the integrated HVACR control and protection system of FIG. 1, including a peripheral or remote control interface.

Referring to FIG. 14, peripheral or remote control interface 140 provides a communications interface with microcontroller 30 for digital devices 170, such as hand-held peripheral devices, modems, wireless devices, PDAs, PCs, laptops, network connections, Web page servers, or Internet gateways. Monitoring and programming interface 140 may be an RS232 interface or may include other interface devices, such as an IR transceiver or network interface port. Digital device 170 may be used to monitor and program control system 10. For example, digital device 170 may be used to set parameter limits, monitor parameters, receive diagnostic and failure notifications, and view or download trend or other historic information. Interface 140 may be coupled with output pins 9 and 10 of microcontroller 30, which provide a port which is compatible with interface 140. Alternatively, interface 140 may include other components or interface devices for providing other industry standard or unique interface connections for digital devices 170.

Figure 15:
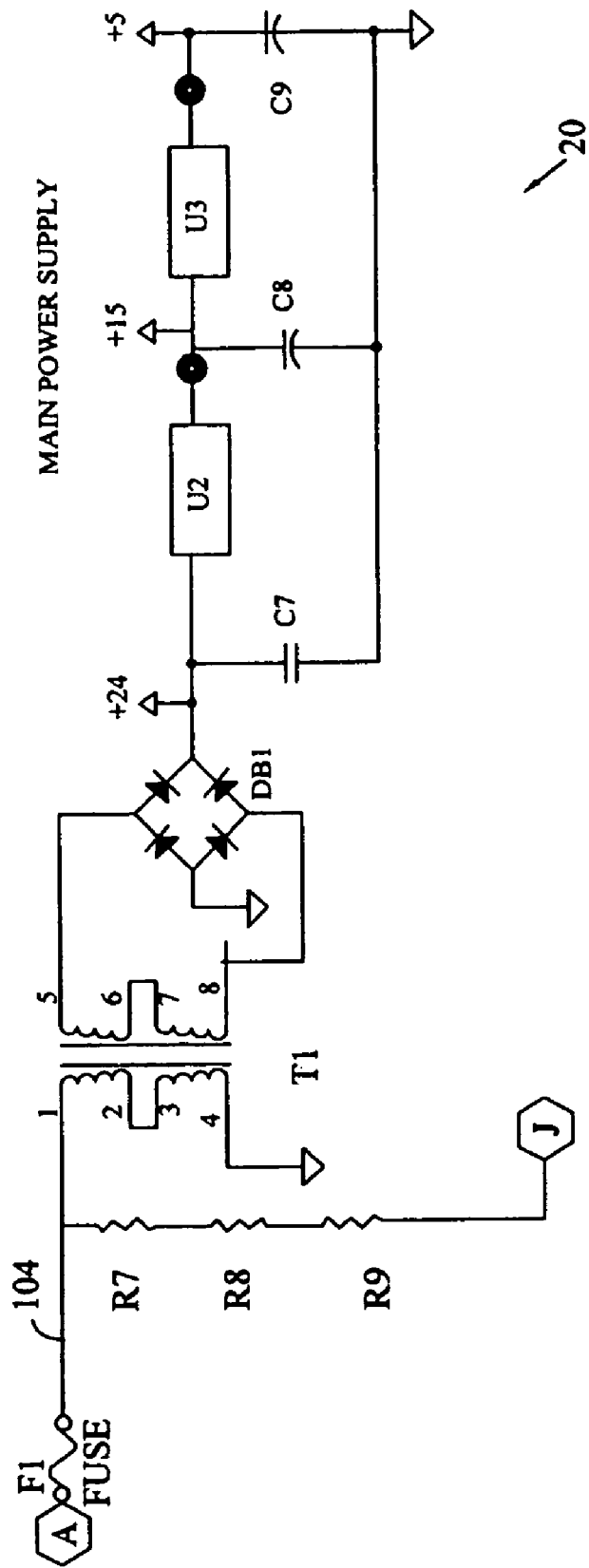
FIG. 15 is a schematic diagram of a portion of the integrated HVACR control and protection system of FIG. 1, including a main power supply.

Referring to FIG. 15, voltage supply signal is carried by line 104 to main power supply 20, which includes transformer T1; rectifier DB1, the output of which provides 24 volt DC supply; voltage regulator U2, the output of which provides 15 volts DC; and voltage regulator U3, the output of which provides 5 volts DC.

Referring to FIG. 9, microcontroller 30 may be a microcontroller having onboard memory 31 to store software and parameter limits, data maps, trend information, and other data necessary to enable the various functions of microcontroller 30. Microcontroller 30 may be, for example, Part No. MC68HC908GP32, available from Motorola Incorporated of Arlington Heights, Ill. Microcontroller 30 is enabled by software such as is represented by the flowchart diagrams of FIG. 19.

The present invention also includes a method and software enabling digital device 170, for example a PDA, and other such peripheral or remote digital devices, to monitor and control HVACR system 1 via interface with control system 10. Referring to FIGS. 17A and 17B, exemplary PDA software interfaces are shown. FIG. 17A shows PDA interface 172 for viewing and editing parameter limits. FIG. 17B shows PDA interface 174 for monitoring parameters and system status, for example, diagnostic and fault information. The display values may be automatically updated on a period basis, or PDA interface 174 provides input 173 for refreshing the displayed parameter values.

Figure 18:
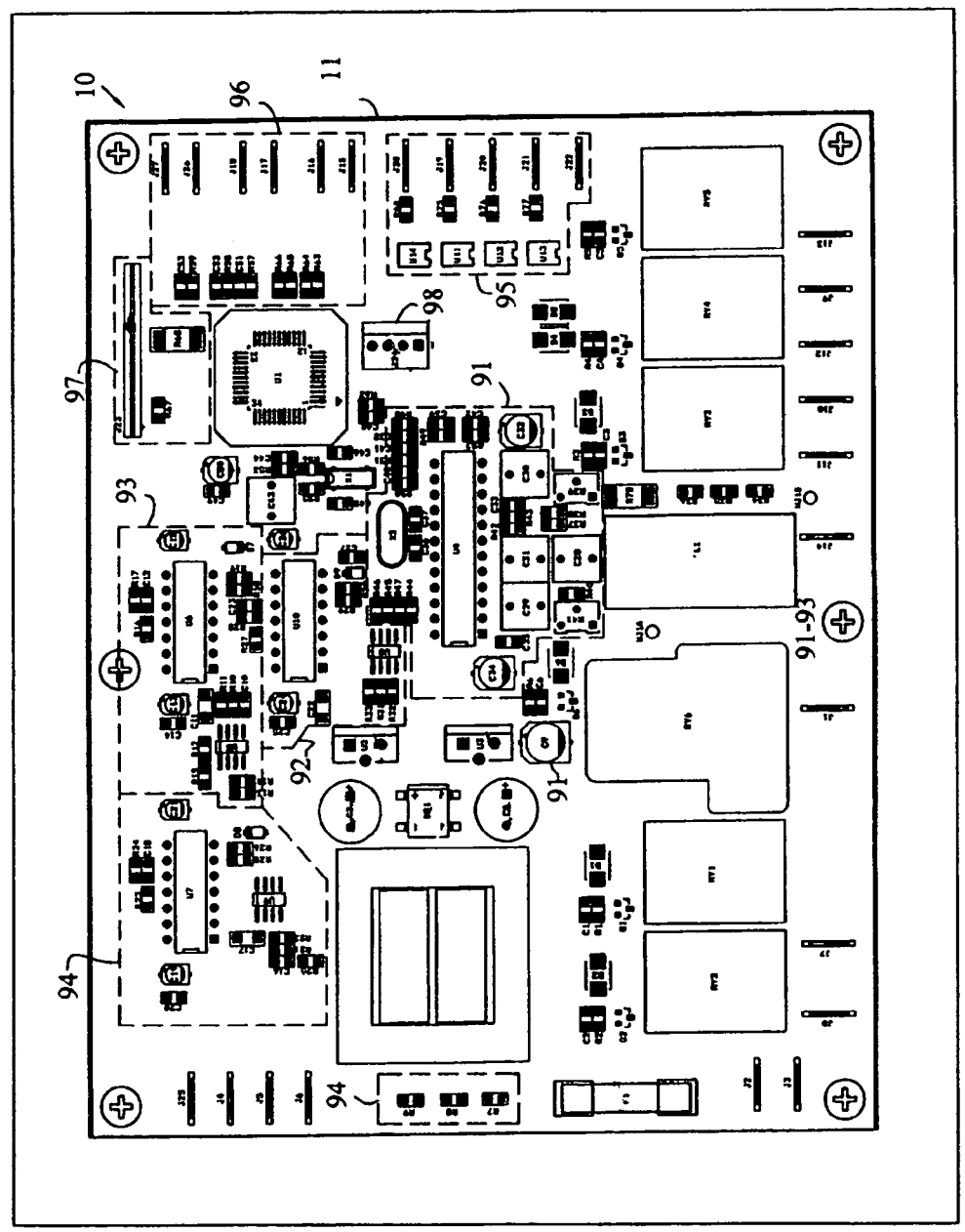
FIG. 18 is a plan view of an exemplary embodiment of the integrated HVACR control and protection system of FIG. 1.

Referring to FIG. 18, a plan view of control system 10 is shown, including the component layout on circuit board 11. Advantageously, the modularity of control system 10 allows circuit card 11 to be populated with only those components required to provide the selected combination of subsystems. For example, as shown in FIG. 18, each set of components associated with a subsystem may be populated into circuit board 11, or left out if not required for the selected configuration. This aspect of the present invention provides for easy tailoring and production of control system 10 at minimal cost by selecting and populating only those components required for the selected combination of subsystems.

The following specific modular subsystems are outlined in dashed lines and marked with a reference number (FIG. 18) and may be excluded from the control system without affecting the functionality of the other modules: real power sensor components 91, very high current sensor components 92, current sensor components 93, voltage sensor components 94, thermostat interface components 95, temperature sensor interface components 96, vocal user display and control interface components 97, and peripheral or remote control interface components 98.

Figure 19:
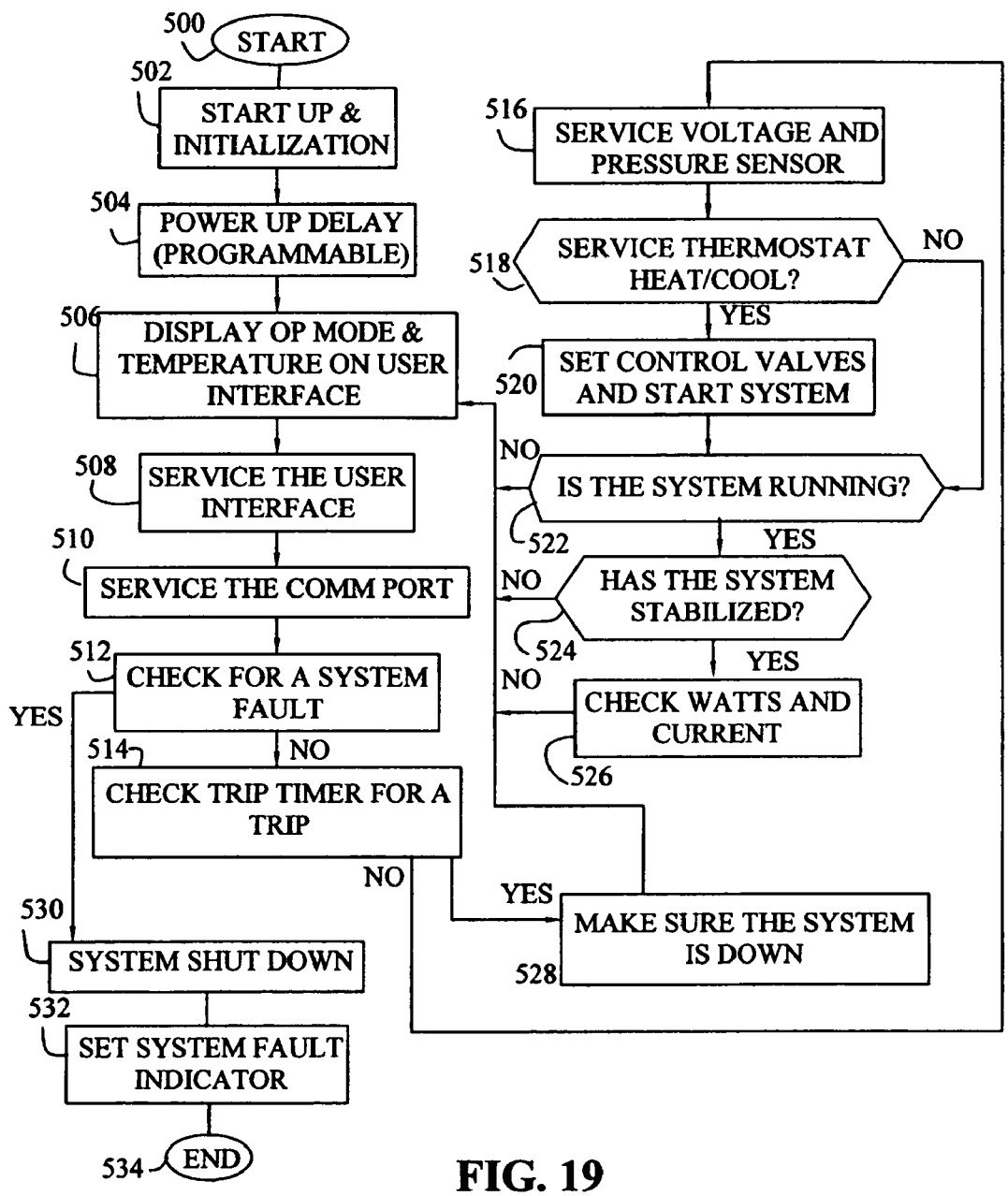
FIG. 19 is a flow chart illustrating the steps of controlling an HVACR system according to the present invention.

Referring to FIG. 19, a subroutine for enabling microcontroller 30 is shown. Subroutine 500 begins in step 502. In step 502, microcontroller 30 provides power to HVACR system 1 and initializes various functions of microcontroller 30, for example, ports, registers, etc. In step 504, microcontroller 30 delays for a programmable power-up delay. In step 506, microcontroller 30 outputs display information, such as operating mode and temperature, to user control interfaces 130 and 140. In step 508, microcontroller 30 receives input from control interfaces 130 and 140. In step 510, microcontroller 30 provides data input and output via peripheral low remote control interface 140.

In step 512, microcontroller 30 checks for a system fault in HVACR system 1. If a fault is detected, subroutine 500 continues at step 530, else step 514 is completed. In step 514, microcontroller 30 determines whether a malfunction requiring only a shutdown for a specified period of time has initiated the trip timer. If the trip timer has been initiated and is not expired, then in step 528, HVACR system 1 is shut down and subroutine 500 continues at step 506. If the trip timer has not been initiated or has expired, then step 516 is completed.

In step 516, microcontroller 30 receives sensor circuit inputs from sensors such as power, voltage, transient current, run current, and pressure. In step 218, microcontroller 30 receives inputs from thermostat interface 110 and temperature sensor interface 120. In step 516 it is determined whether HVACR system 1 activation is required; if so, step 520 is completed, else subroutine 500 continues at step 522. In step 520, microcontroller 30 provides power distribution, switching, and control of HVACR system 1 via HVACR switching circuit 100 and HVACR component interface 102 to activate HVACR system 1. In step 522, microcontroller 30 determines whether HVACR system 1 is running. If HVACR system 1 is running, then step 524 is completed, else subroutine 500 continues at step 506. In step 502, microcontroller 30 determines whether HVACR system 1 has stabilized, for example, by monitoring parameters such as current and voltage. If HVACR system 1 has stabilized, step 526 is completed, else subroutine 500 continues at step 506. In step 526, microcontroller 30 evaluates power and RMS current to determine whether a system fault has occurred. After step 526 is completed, subroutine 500 continues at step 506.

The values of the circuit components shown in FIGS. 5–15 are given below in Table 2.

TABLE 2

| Component | Value/Part No. |
|---|---|
| C1 | .1 |
| C10 | .1 |
| C11 | 1.0 |
| C12 | .1 |
| C13 | 2.2 |
| C14 | .1 |
| C15 | 2.2 |
| C16 | .1 |
| C17 | 1.0 |
| C18 | .1 |
| C19 | 2.2 |
| C2 | .1 |
| C20 | .1 |
| C21 | 2.2 |
| C22 | 1.0 |
| C23 | .1 |
| C24 | 2.2 |
| C25 | .1 |
| C26 | 2.2 |
| C27 | .1 |
| C28 | .033 |
| C29 | .033 |
| C3 | .1 |
| C30 | .033 |
| C31 | .033 |
| C32 | 47 16 V |
| C33 | .1 |
| C34 | 47 16 V |
| C35 | .01 |
| C36 | 27 P |
| C37 | 27 P |
| C38 | .01 |
| C39 | .01 |
| C4 | .1 |
| C40 | .01 |
| C41 | .01 |
| C42 | .01 |
| C43 | .033 |
| C44 | .01 |
| C45 | 27 p |
| C46 | 27 p |
| C48 | .1 |
| C49 | .1 |
| C5 | .1 |
| C50 | 10 16 V |
| C51 | .1 |
| C52 | .1 |
| C53 | .1 |
| C6 | .1 |
| C7 | 470 50 V |
| C8 | 470 50 V |
| C9 | 100 16 V |
| D1 | MBRS1100T3 |
| D2 | MBRS1100T3 |
| D3 | MBRS1100T3 |
| D4 | MBRS1100T3 |
| D5 | MBRS1100T3 |
| D6 | MBRS1100T3 |
| J23 | FH21-26S-1DSA |
| Q1 | MGSF-1N03LT1 |
| Q2 | MGSF-1N03LT1 |
| Q3 | MGSF-1N03LT1 |
| Q4 | MGSF-1N03LT1 |
| Q5 | MGSF-1N03LT1 |
| Q6 | MGSF-1N03LT1 |
| R1 | 100K |
| R10 | 2.2 M |
| R11 | 2.2 M |
| R12 | 10K |
| R13 | 2.2 M |
| R14 | 2.2 M |
| R15 | 100K |
| R16 | 20K |
| R17 | 10K |
| R18 | 10K |
| R19 | 3.32K |
| R2 | 100K |
| R20 | 6.34K |
| R21 | 2.2 M |

TABLE 2-continued

| Component | Value/Part No. |
|---|---|
| R22 | 2.2 M |
| R23 | 20K |
| R24 | 10K |
| R25 | 10K |
| R26 | 3.32K |
| R27 | 20K |
| R28 | 10K |
| R29 | 10K |
| R3 | 100K |
| R30 | 3.32K |
| R31 | 10.7K |
| R32 | 10K |
| R33 | 10K |
| R34 | 1 M |
| R35 | 1 M |
| R36 | 750K |
| R37 | 499 |
| R38 | 680 |
| R39 | 2K |
| R4 | 100K |
| R40 | 1K |
| R41 | 10K |
| R42 | 1K |
| R43 | 10K |
| R44 | 10K |
| R45 | 10K |
| R46 | 10K |
| R47 | 10K |
| R48 | 1K |
| R49 | 1K |
| R5 | 100K |
| R50 | 1K |
| R51 | 1K |
| R52 | 1K |
| R53 | 10K |
| R55 | 332K |
| R56 | 10 M |
| R57 | 100K |
| R58 | 100K |
| R59 | 100K |
| R6 | 100K |
| R60 | 3.32K |
| R62 | 10K |
| R63 | 10K |
| R64 | 10K |
| R65 | 10K |
| R66 | 10K |
| R67 | 3.9K |
| R68 | 47 |
| R7 | 127K |
| R78 | 49.9 1 W |
| R8 | 127K |
| R9 | 127K |
| U1 | MC68HC908GP32_QFP |
| U10 | AD536AKQ |
| U11 | PS2505-1 |
| U12 | PS2505-1 |
| U13 | PS2505-1 |
| U14 | PS2505-1 |
| U2 | NJM7815UA |
| U3 | NJM7805UA |
| U5A | TL082 |
| U5B | TL082 |
| U7 | AD536AKQ |
| U8A | LM2903 |
| U8B | LM2903 |
| U9A | TL082 |

While this invention has been described as having exemplary embodiments and scenarios, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control and protection system for an environmental conditioning system, comprising:
    a first microcontroller;
    a temperature input coupled to said first microcontroller;
    at least two sensor circuits coupled to said first microcontroller, said at least two sensor circuits selected from a group consisting of: a power sensor circuit, a voltage sensor circuit, a current sensor circuit, and a terminal pin venting sensor circuit;
    a user control coupled to said first microcontroller; and
    a plurality of switching devices driven by said first microcontroller and adapted to control components of the environmental conditioning system, said first microcontroller driving said plurality of switching devices in response to evaluating signals received from said user control, said temperature input, and said at least two sensor circuits.

2. The control and protection system of claim 1, wherein said user control includes a device selected from a group consisting of a PDA, computer, modem, infrared transceiver, wireless transceiver, Internet Web-page server, Internet gateway, and computer network.

3. The control and protection system of claim 1, further comprising:
    software associated with said first microcontroller, said software including operating parameters associated with said signals received from said temperature input and said at least two sensor circuits, and said software including limits associated with said operating parameters;
    said software enabling said first microcontroller to operate said plurality of switching devices based on said limits and said operating parameters; and
    said user control being capable of receiving at least one of said operating parameters and said limits from said first microcontroller.

4. The control and protection system of claim 3, wherein said user control is capable of transmitting at least one of said operating parameters and said limits to said first microcontroller.

5. The control and protection system claim 4, wherein said user control is capable of changing said limits.

6. The control and protection system of claim 1, wherein said power sensor circuit is capable of measuring real power.

7. The control and protection system of claim 1, further comprising a circuit card and wherein said first microcontroller and said at least two sensor circuits are mounted to said circuit card.

8. The control and protection system of claim 7, where said user control is mounted to said circuit card.

9. The control and protection system of claim 7, where said user control is remotely located from said circuit card.

10. The control and protection system of claim 7, where said user control includes a second microcontroller, a display device, and an input device.

11. The control and protection system of claim 10, where said input device includes a wireless communications device.

12. A control and protection system for an environmental conditioning system, comprising:
    a microcontroller;
    a plurality of modules selected from a group consisting of:
        a power sensor circuit, a voltage sensor circuit, a current sensor circuit, and a terminal pin venting sensor circuit, said plurality of modules coupled to said microcontroller and to the environmental conditioning system;

a temperature input coupled to said microcontroller;

a user control coupled to said microcontroller; and a plurality of switching devices driven by said microcontroller and adapted to control components of the environmental conditioning system in response to said microcontroller evaluating signals received from said user control, said temperature input, and said plurality of modules.

13. The control and protection system of claim 12, wherein said power sensor circuit is capable of measuring real power drawn by a compressor of the environmental conditioning system.

14. The control and protection system of claim 12, further comprising:

software associated with said microcontroller, said software including operating parameters associated with signals received from said temperature input and said plurality of modules, and said software including limits associated with said operating parameters;

said software enabling said microcontroller to operate said plurality of switching devices based on said limits and said operating parameters; and said user control being capable of receiving at least one of said operating parameters and said limits from said microcontroller.

15. The control and protection system of claim 14, wherein said user control is capable of transmitting at least one of said operating parameters and said limits to said microcontroller.

16. The control and protection system of claim 12, wherein said user control includes a device selected from a group consisting of a PDA, computer, modem, infrared transceiver, wireless transceiver, Internet Web-page server, Internet gateway, and computer network.

17. A control and protection system for an environmental conditioning system, comprising:

a local control having a first microcontroller;

a temperature input coupled to said first microcontroller;

an electrical sensor circuit mounted on said local control and coupled to said first microcontroller;

a remote control having a second microcontroller;

a user control mounted on said remote control and coupled to said second microcontroller;

a communications interface coupling said first microcontroller and said second microcontroller; and a plurality of switching devices mounted on said local control and driven by said first microcontroller and adapted to control components of the environmental conditioning system, said first microcontroller driving said plurality of switching devices in response to evaluating signals received from said user control, said temperature input, and said sensor circuit.

18. The control and protection system of claim 17, further comprising:

first software associated with said first microcontroller, said first software including operating parameters associated with said signals received from said temperature input and said sensor circuit, and said first software including limits associated with said operating parameters, said first software enabling said first microcontroller to operate said plurality of switching devices based on said limits and said operating parameters; and second software associated with said second microcontroller, said second software enabling said second microcontroller to receive at least one of said operating parameters and said limits from said first microcontroller, and to transmit at least one of said operating parameters and said limits to said first microcontroller.

19. The control and protection system of claim 18, wherein said remote control includes a wireless transceiver coupled to second microcontroller.

20. The control and protection system of claim 18, wherein said remote control includes a device selected from a group consisting of a PDA, computer, modem, infrared transceiver, wireless transceiver, Internet Web-page server, Internet gateway, and computer network.

21. The control and protection system of claim 18, wherein said user control includes a display device and an input device; and said user control is capable of changing said limits.

22. The control and protection system of claim 17, wherein said sensor circuit includes a current sensing device.

* * * * *